(12) United States Patent
Reial et al.

(10) Patent No.: US 10,419,987 B2
(45) Date of Patent: Sep. 17, 2019

(54) EFFICIENT UPLINK MEASUREMENT SIGNAL RX AND TX WINDOW ALLOCATION WITH TIMING MISALIGNMENT

(71) Applicant: Telefonaktiebolaget LM Ericsson (publ), Stockholm (SE)

(72) Inventors: Andres Reial, Malmö (SE); Rui Fan, Beijing (CN); Johan Rune, Lidingö (SE); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 51 days.

(21) Appl. No.: 15/535,472

(22) PCT Filed: Sep. 22, 2016

(86) PCT No.: PCT/CN2016/099706
§ 371 (c)(1),
(2) Date: Jun. 13, 2017

(87) PCT Pub. No.: WO2018/053748
PCT Pub. Date: Mar. 29, 2018

(65) Prior Publication Data
US 2018/0242210 A1    Aug. 23, 2018

(51) Int. Cl.
*H04W 36/00* (2009.01)
*H04B 17/15* (2015.01)
(Continued)

(52) U.S. Cl.
CPC ........ *H04W 36/0088* (2013.01); *H04B 17/15* (2015.01); *H04W 24/10* (2013.01); *H04W 56/0095* (2013.01); *H04W 72/0413* (2013.01)

(58) Field of Classification Search
CPC ..... H04W 24/00; H04W 80/04; H04W 84/12; H04W 88/06; H04W 88/08; H04W 84/14;
(Continued)

(56) References Cited

U.S. PATENT DOCUMENTS

| 8,340,234 B1 | 12/2012 | Cheng et al. |
| 8,743,914 B1 | 6/2014 | Jensen |

(Continued)

FOREIGN PATENT DOCUMENTS

| CN | 103001749 A | 3/2013 |
| CN | 103384376 A | 11/2013 |

(Continued)

OTHER PUBLICATIONS

Sahlin, Henrik et al., "Random Access Preamble Format for Systems with Many Antennas", Globecom Workshops, Dec. 8-12, 2014.

(Continued)

*Primary Examiner* — Brenda H Pham
(74) *Attorney, Agent, or Firm* — Coats & Bennett, PLLC

(57) ABSTRACT

A UE (22) in handover consideration transmits an uplink measurement signal comprising repetitions of a predetermined identity code. Network access nodes (18, 20) that are candidate handover target nodes receive the signal and use it for channel quality and timing offset measurements. To ensure that a predetermined minimum number of symbols are received without interference from user traffic, an uplink measurement signal reception window is defined for each candidate node (18, 20). The timing of the reception window is based on a total timing misalignment between the UE (22) and the candidate node. In some embodiments, the duration of the reception window is based on an uncertainty in the timing misalignment estimate. Reception of user data is precluded during the uplink measurement signal reception (Continued)

window (on the allocated subband, if the full uplink carrier is not used). The UE transmits the uplink measurement signal in an uplink measurement signal transmission window. In some embodiments, the duration of the transmission window is sufficient to encompass the uplink measurement signal reception windows of all candidate nodes.

34 Claims, 12 Drawing Sheets

(51) Int. Cl.
*H04W 56/00* (2009.01)
*H04W 72/04* (2009.01)
*H04W 24/10* (2009.01)

(58) Field of Classification Search
CPC ....... H04W 84/18; H04W 74/08; H04W 8/26; H04W 36/18; H04W 36/0011; H04W 36/14; H04W 36/08; H04L 43/50; H04L 43/0852; H04L 43/08; H04B 17/003; H04B 7/2125; H04B 7/2126
USPC .... 370/310.2, 328, 338, 349, 252, 324, 331, 370/350
See application file for complete search history.

(56) References Cited

U.S. PATENT DOCUMENTS

| | | | |
|---|---|---|---|
| 2004/0100898 A1 | 5/2004 | Anim-Appiah et al. | |
| 2006/0215779 A1 | 9/2006 | Shiina | |
| 2007/0217526 A1 | 9/2007 | Park et al. | |
| 2009/0010316 A1 | 1/2009 | Rofougaran | |
| 2009/0225908 A1 | 9/2009 | Masuda et al. | |
| 2009/0232126 A1 | 9/2009 | Cordeiro et al. | |
| 2010/0020905 A1 | 1/2010 | Mansour et al. | |
| 2010/0172423 A1 | 7/2010 | Chrabieh et al. | |
| 2010/0309993 A1 | 12/2010 | Hao et al. | |
| 2010/0311428 A1 | 12/2010 | Zhang et al. | |
| 2011/0086658 A1 | 4/2011 | Baldemair | |
| 2011/0243040 A1 | 10/2011 | Khan et al. | |
| 2012/0093200 A1 | 4/2012 | Kyeong | |
| 2012/0250523 A1 | 10/2012 | Miki | |
| 2013/0045690 A1 | 2/2013 | Seol et al. | |
| 2013/0070726 A1* | 3/2013 | Zhang | H04W 56/0045 370/331 |
| 2013/0121315 A1* | 5/2013 | Langereis | H04W 56/0045 370/336 |
| 2015/0056981 A1 | 2/2015 | Song et al. | |
| 2015/0382336 A1 | 12/2015 | Zhang et al. | |
| 2017/0006637 A1 | 1/2017 | Sahlin et al. | |
| 2017/0006638 A1 | 1/2017 | Sahlin et al. | |

FOREIGN PATENT DOCUMENTS

| | | |
|---|---|---|
| CN | 105636108 A | 6/2016 |
| EP | 1274193 A1 | 1/2003 |
| WO | 2005088853 A1 | 9/2005 |
| WO | 2007089199 A1 | 8/2007 |
| WO | 2007149290 A1 | 12/2007 |
| WO | 2009151358 A1 | 12/2009 |
| WO | 2014110875 A1 | 7/2014 |
| WO | 2015084225 A1 | 6/2015 |
| WO | 2015084226 A1 | 6/2015 |
| WO | 2015144208 A1 | 10/2015 |
| WO | 2015144256 A1 | 10/2015 |
| WO | 2015188861 A1 | 5/2016 |
| WO | 2016072886 A1 | 5/2016 |
| WO | 2016141782 A1 | 9/2016 |

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 11)", Technical Specification, 3GPP TS 36.211 V11.3.0, Jun. 1, 2013, pp. 1-108, 3GPP, France.
3rd Generation Partnership Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11.3.0, Jun. 1, 2013, pp. 1-176, 3GPP, France.
Sesia, S. et al., "LTE. The UMTS Long Term Evolution. From Theory to Practice", Second Edition, Jan. 1, 2011, pp. 1-794, John Wiley & Sons Ltd.
Ericsson, "Mobility based on DL and UL measurements", 3GPP TSG-RAN WG2 #95, Gothenburg, Sweden, Aug. 22-26, 2016, R2-165539.
Sony, "Mobility Using Uplink Measurements", 3GPP TSG RAN WG2 Meeting #95, Göteborg, Sweden, Aug. 22-26, 2016, R2-165033.
Huawei, "Discussion on requirement for maximum uplink transmission timing difference for CA", 3GPP TSG-RAN WG4 Meeting #76bis, Sophia Antipolis, France, Oct. 12-16, 2015, R4-155817.
CMCC, "Discussion on uplink measurement based mobility", 3GPP TSG-RAN WG2 Meeting #95, Göteborg, Sweden, Aug. 22-26, 2016, R2-165213.

* cited by examiner

TRANSMIT AN UPLINK MEASUREMENT SIGNAL COMPRISING A PLURALITY OF REPETITIONS OF AN UPLINK MEASUREMENT SYMBOL IN AN UPLINK MEASUREMENT SIGNAL TRANSMISSION WINDOW COMPRISING AN INTEGRAL NUMBER OF SYMBOL PERIODS, NOT CONFINED TO PREDEFINED FRAME BOUNDARIES, AND COMPRISING A PREDETERMINED MINIMUM NUMBER OF SYMBOL PERIODS
302

NARROWBAND CARRIER INFORMATION TRANSMITTING MODULE
78

UPLINK MEASUREMENT SIGNAL RECEPTION WINDOW DEFINITION MODULE
80

UPLINK MEASUREMENT SIGNAL RECEPTION WINDOW
INFORMATION TRANSMISSION MODULE
82

*FIG. 15*

UPLINK MEASUREMENT SIGNAL RECEPTION WINDOW ASCERTAINING MODULE
84

UPLINK MEASUREMENT SIGNAL RECEPTION MODULE
86

*FIG. 16*

UPLINK MEASUREMENT SIGNAL TRANSMISSION MODULE
88

*FIG. 17*

EFFICIENT UPLINK MEASUREMENT SIGNAL RX AND TX WINDOW ALLOCATION WITH TIMING MISALIGNMENT

TECHNICAL FIELD

The present invention relates generally to wireless communication systems, and in particular to a method and apparatus for maximizing the utility of synchronization signals in the face of timing misalignment in a handover context.

BACKGROUND

The defining feature of wireless communication networks is user mobility. That is, users may wander freely, while maintaining connectivity to the network, and without experiencing interruptions in voice or data transfer. As known in the art, at any one time a User Equipment (UE) accesses a network, and receives services, from an access node (sometimes referred to as a cell, which also connotes the geographic area served by an access node). Handover is a vital aspect of user mobility. Handover is the process of transferring an ongoing connection of a UE from one access node (the serving node or source node) to another access node (the target node) in order to accomplish a transparent and seamless continuity of service over a large geographic area. The handover should happen without any loss of data and with as small an interrupt as possible.

FIG. 1 depicts a wireless communication network 10 comprising core network (known in the 3GPP Long Term Evolution, or LTE, protocol as an Evolved Packet Core, or EPC) 12 and a Radio Access Network (RAN) 14. The RAN 14 comprises a plurality of base stations (known as eNodeB or eNB in LTE) 16, 18, 20. The eNBs 16, 18, 20 are referred to more generally herein as access nodes 16, 18, 20 of the network 10. Access node 16 provides service to a UE 22, and is referred to herein as the serving node 16. The UE 22 is also within range of access nodes 18, 20, which are candidates for a handover of the UE 22, and are hence referred to herein as candidate nodes 18, 20. All of the access nodes 16, 18, 20 connect to a Mobility Management Entity (MME) 24 and Serving Gateway (SGW) 26 of the core network 12. As known in the art, the core network 12 includes numerous additional nodes, and provides communication and data connectivity to numerous other networks (not shown).

Prior to initiating a handover procedure, it is necessary to ascertain a suitable target node 18, 20, and to ensure that it is possible for the UE under consideration to sustain reliable communication with that target node 18, 20. Candidates for suitable target node 18, 20 are usually stored in so-called neighbor lists, which are stored at, or at least are accessible by, the serving node 16. To ensure that it is possible to sustain reliable communication with a target node 18, 20, the connection quality in the target cell must be estimated before the handover procedure is initiated. Additionally, before a handover is initiated, a precise estimate of the timing difference between the UE 22 and the target node 18, 20 must be obtained, so that a Timing Advance (TA) value may be calculated and transmitted to the UE 22, allowing the UE 22 to be subframe-synchronized to target node 18, 20.

The connection quality and timing in the target node 18, 20 are estimated by measurements related to the UE 22. Either or both of downlink and uplink measurements can be considered. In legacy systems, handover has been most commonly based on downlink measurements. This is a natural solution, as all access nodes 16, 18, 20 continuously transmit pilot signals, which UEs 22 in neighboring cells can use to estimate, e.g., the target cell connection quality. This is true in the Global System for Mobile Communications (GSM) (using the Broadcast Control Channel, or BCCH), Wideband Code Division Multiple Access (WCDMA) (using the Common Pilot Channel, or CPICH) and Long Term Evolution (LTE) (using Cell-specific Reference Signals, or CRS) as well as in IEEE 802.11 Wireless Local Area Networks (WLAN) such as Wi-Fi (using the beacon frame). Using these downlink signals, a UE 22 may estimate the quality of neighbor cells with relatively good accuracy.

Modern and future cellular systems will use advanced antenna systems to a large extent. With such antennas, signals will be transmitted in narrow beams, to increase signals strength in some directions, and/or to reduce interference in other directions. Continuously transmitting pilot signals in all of these beams is undesirable, since it will generate significant interference; increase the base station energy consumption; and will not serve the function of facilitating the building of neighbor lists, since the narrow, targeted beams will not be received generally by all UEs 22 in the cell and in neighboring cells.

Accordingly, in systems with advanced antennas and sophisticated beamforming, it becomes much more natural to rely on uplink measurements to assess channel quality and timing for potential handover. For fifth generation (5G) networks, defined, e.g., according to the 5G New Radio standard, an uplink measurement-based mobility approach may be devised where an uplink measurement signal is transmitted by the UE 22, similar to the Physical Random Access Channel (PRACH) signal design.

FIG. 2 depicts a functional view of a PRACH reception model, as disclosed by Henrik Sahlin, et al., in the paper "Random Access Preamble Format for Systems with Many Antenna," published in Globecom 2014, the disclosure of which is incorporated herein by reference in its entirety. The PRACH signal comprises a number of repetitions of a short sequence (e.g., a Zadoff-Chu sequence). Unlike the legacy LTE PRACH model, in which the PRACH is a single, long OFDM symbol (much longer than data symbols), in this model the PRACH signal comprises a series of normal-length symbols—that is, the same symbol length as is used for data transfer on PUSCH, etc. At an access node receiver, each symbol in the PRACH subframe is individually converted to the frequency domain, and matched filters are applied to detect (potentially one of several) PRACH sequences. Matched filter outputs are accumulated over the subframe, and an Inverse Fast Fourier Transform (IFFT) is applied. At the IFFT output, a time-domain peak appears—the delay of which corresponds to a timing error between the UE and the access node receiver. The signal design allows reception and timing estimation with only rough initial timing alignment; the timing accuracy must be better than one Orthogonal Frequency Division Multiplexing (OFDM) symbol length. If the misalignment exceeds one OFDM symbol, estimation returns an incorrect timing offset estimate. The key to this approach is that each PRACH symbol repeats the same sequence; hence the receiver accumulates a sufficient number of symbols to acquire enough energy to perform the correlation and timing detection.

In a handover situation, an uplink measurement signal designed to facilitate handover timing, which may be similar to the PRACH design, would be transmitted by the UE 22 using download timing with respect to its source node 16. Since the received uplink measurement signal at a candidate node 18, 20 is not necessarily aligned with symbol and subframe boundaries to within the cyclic prefix, the uplink measurement signal will "spill over" into symbol periods in which reception of user data symbols has been scheduled. These user data cannot be received without interference from the uplink measurement signal, and vice versa. Therefore, for candidate nodes 18, 20 to detect and measure the uplink measurement signal from the UE 22, they must reserve all uplink symbol periods during any subframes where the uplink measurement signal is expected (in the relevant frequency subband, if the full uplink carrier is not used).

In cases where the timing misalignment between the source node 16 and a candidate node 18, 20 exceeds one OFDM symbol (e.g., 14 μsec @ 75 kHz numerology), misalignment at the candidate node subframe reserved for uplink measurement signal reception leads to uplink measurement signal detection performance degradation. The timing misalignment may be due to propagation delay. For example, in rural deployments, a distance of >4 km will introduce such an error. Additionally or alternatively, the timing misalignment may be due to inter-node synchronization inaccuracy.

If the nominal single-subframe uplink measurement signal allocation is used at a misaligned candidate node 18, 20, only a part of the transmitted uplink measurement signal will fall within the allocated subframe. In this case, part of the transmitted uplink measurement signal energy is not utilized and measurement quality is reduced. Furthermore, the misaligned part of the uplink measurement signal may interfere with reception of user data from other UEs 22, as it is received in a subframe allocated to user traffic.

One straightforward solution would be to reserve all subframes containing uplink measurement signal symbols for uplink measurement signal reception and measurement. However, in this case resource utilization efficiency suffers. Reservation of two subframes means that only 50% of the reserved time window will actually be utilized for uplink measurement signal reception. The other 50% during the uplink measurement signal subframes in non-aligned candidate nodes will remain unused, thus reducing the capacity of the network. The capacity loss may be significant since the extended uplink measurement signal reception window may be applied at many candidate nodes, at many uplink measurement sessions, for many UEs 22.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

In one aspect, according to embodiments of the present invention described and claimed herein, uplink measurement signal reception window allocation in candidate target network access nodes is done at the granularity of individual uplink measurement signal symbols, based on estimates or bounds of timing misalignment and uncertainty in those estimates, rather than the granularity of a subframe. That is, an uplink measurement signal reception window—comprising at least a predetermined minimum number of individual symbol periods—is defined for each candidate target node, and possibly for a subband of the uplink carrier. The window, or set of symbol periods, may cross a subframe boundary. Symbol periods not allocated to the uplink measurement signal reception window, and/or on frequencies outside of the allocated subband, are available for the candidate node to schedule the receipt of user data. A UE under handover consideration transmits the uplink measurement signal (comprising at least a predetermined minimum number of repetitions of a predetermined sequence) in a corresponding uplink measurement signal transmission window.

In another aspect, according to embodiments of the present invention described and claimed herein, the timing of the uplink measurement signal reception window at each candidate node is adjusted based on an estimate of the total timing misalignment between the UE and the candidate node. The timing misalignment may include components arising from timing misalignment between the UE's serving node at the candidate node, and/or from different propagation delays between the UE and its serving node, and the UE and the candidate node.

In yet another aspect, according to embodiments of the present invention described and claimed herein, the length or duration of one or both of the uplink measurement signal reception window (at each candidate node) and uplink measurement signal transmission window (at the handover UE) may be extended beyond the predetermined minimum number of symbol periods, based on an uncertainty in the timing misalignment estimate. In particular, the timing misalignment uncertainty may be accounted for by extending the uplink measurement signal reception window at a candidate node, e.g., by prepending and appending symbol periods to the window—thus excluding user data on the allocated subband for longer than the predetermined minimum duration, allowing for the actual signal to be received (without interference) earlier or later than estimated timing misalignment predicted. Alternatively, the length or duration of all uplink measurement signal reception windows are the same, with only their relative timings differing in response to the estimated timing misalignment for each. In this case, the uplink measurement signal transmission window at the handover UE may be extended, e.g., by prepending and appending symbols to the uplink measurement signal, to cover a span that includes within its extent all of the various uplink measurement signal reception window timings. In still another alternative, the length of both one or more uplink measurement signal reception windows and the uplink measurement signal transmission window may be extended beyond the predetermined minimum number of symbol periods.

One embodiment relates to a method, performed by a serving node of a first User Equipment (UE) in a wireless communication network, of defining an uplink measurement signal reception window for a first candidate node comprising an access node in the network that is a candidate target for handing over the first UE. A total timing misalignment between the first UE and the first candidate node is estimated. The uplink measurement signal reception window comprising an integral number of symbol periods, not confined to predefined frame boundaries, comprising at least a predetermined minimum number of symbol periods and based on the estimated timing misalignment, is defined. Information about the defined uplink measurement signal reception window is transmitted to the first candidate node.

Another embodiment relates to a method, performed by a candidate node comprising an access node in a wireless communication network that is a candidate target for handing over a first User Equipment (UE) from a serving node comprising a different access node in the network providing service to the first UE, of receiving an uplink measurement signal from the first UE. An uplink measurement signal reception window comprising an integral number of symbol periods, not confined to predefined frame boundaries, comprising at least a predetermined minimum number of symbol periods and based on an estimated total timing misalignment between the first UE and the candidate node is ascertained. An uplink measurement signal is received during the uplink measurement signal reception window.

Yet another embodiment relates to a method, performed by a User Equipment (UE) in a wireless communication network, of transmitting an uplink measurement signal to a plurality of candidate nodes, each comprising a different access node in the network that is a candidate target for handing over the UE from a serving node comprising an access node in the network different from any candidate node and providing service to the UE. An uplink measurement signal comprising a plurality of repetitions of an uplink measurement symbol in an uplink measurement signal transmission window comprising an integral number of symbol periods, not confined to predefined frame boundaries, and comprising a predetermined minimum number of symbol periods is transmitted.

Still another embodiment relates to a serving node comprising an access node in a wireless communication network providing service to a first User Equipment (UE) in the network, the network also including a plurality of candidate nodes comprising access nodes in the network, other than the serving node, that are candidate targets for handing over the first UE. The serving node includes one or more antennas and a transceiver operatively connected to the antennas. The serving node also includes processing circuits operatively connected to the transceiver. The processing circuits are operative to estimate a total timing misalignment between the first UE and a first candidate node; define an uplink measurement signal reception window comprising an integral number of symbol periods, not confined to predefined frame boundaries, comprising at least a predetermined minimum number of symbol periods and based on the estimated timing misalignment; and transmit information about the defined uplink measurement signal reception window to the first candidate node.

Still another embodiment relates to a candidate node comprising access node in a wireless communication network that is a candidate target for handing over a first User Equipment (UE) from a serving node comprising a different access node in the network providing service to the first UE. The candidate node includes one or more antennas and a transceiver operatively connected to the antennas. The candidate node also includes processing circuits operatively connected to the transceiver. The processing circuits are operative to ascertain an uplink measurement signal reception window comprising an integral number of symbol periods, not confined to predefined frame boundaries, comprising at least a predetermined minimum number of symbol periods and based on an estimated total timing misalignment between the first UE and the candidate node; and receive an uplink measurement signal during the uplink measurement signal reception window.

Still another embodiment relates to a User Equipment (UE) operative in a wireless communication network and being served by a serving node comprising an access node in the network providing service to the UE, wherein the network further includes a plurality of candidate nodes, each comprising a different access node in the network that is a candidate target for handing over the UE from the serving node. The UE includes one or more antennas and a transceiver operatively connected to the antennas. The UE also includes processing circuits operatively connected to the transceiver. The processing circuits are operative to transmit an uplink measurement signal comprising a plurality of repetitions of an uplink measurement symbol in an uplink measurement signal transmission window comprising an integral number of symbol periods, not confined to predefined frame boundaries, and comprising a predetermined minimum number of symbol periods.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 15 is a diagram of modules comprising a virtual function module architecture of an access node apparatus operating as a serving node.

FIG. 16 is a diagram of modules comprising a virtual function module architecture of an access node apparatus operating as a candidate handover target node.

FIG. 17 is a diagram of modules comprising a virtual function module architecture of a UE apparatus.

DETAILED DESCRIPTION

Figure 1:
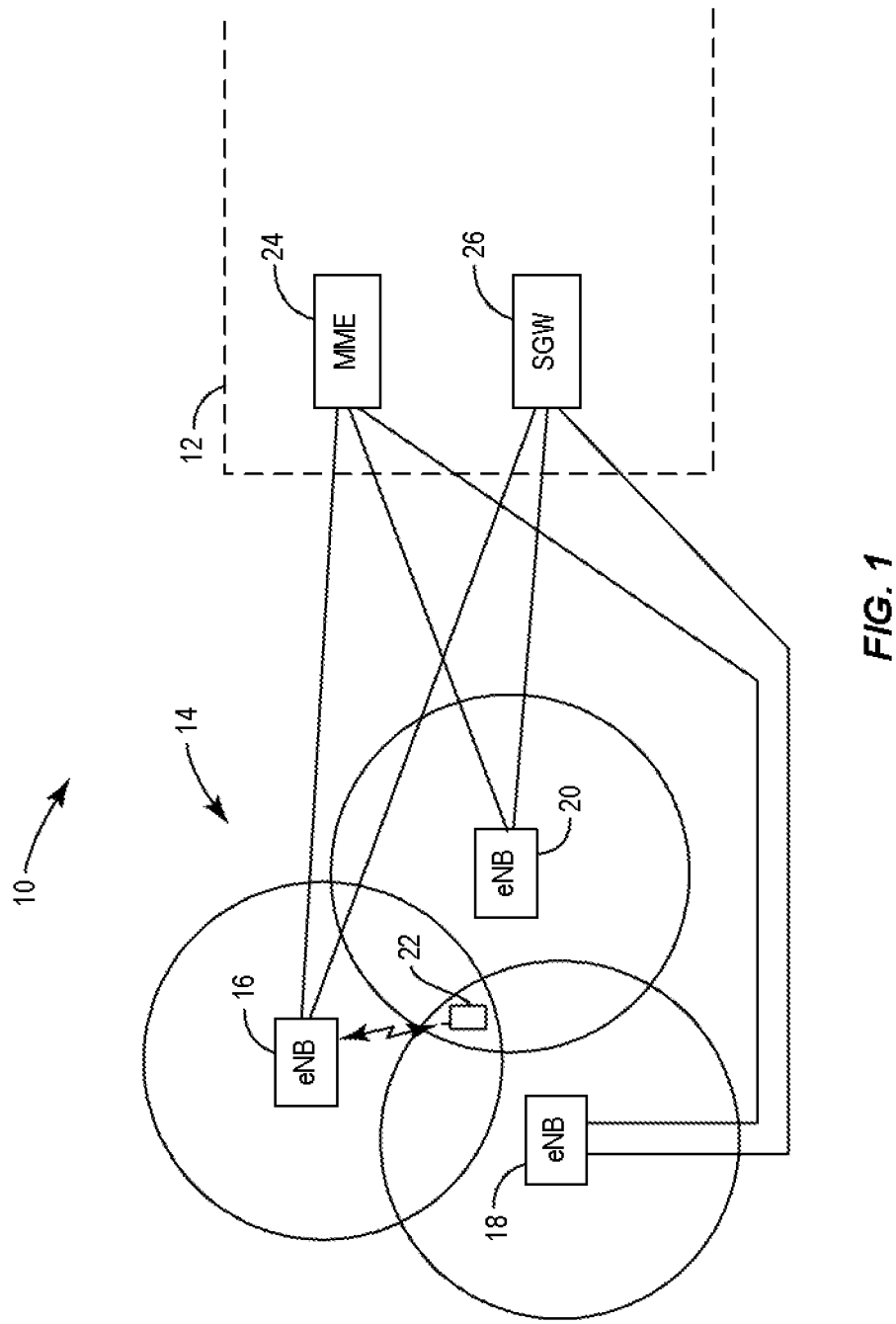
FIG. 1 is a network diagram depicting a UE, its serving node, and a plurality of candidate nodes.
Figure 2:
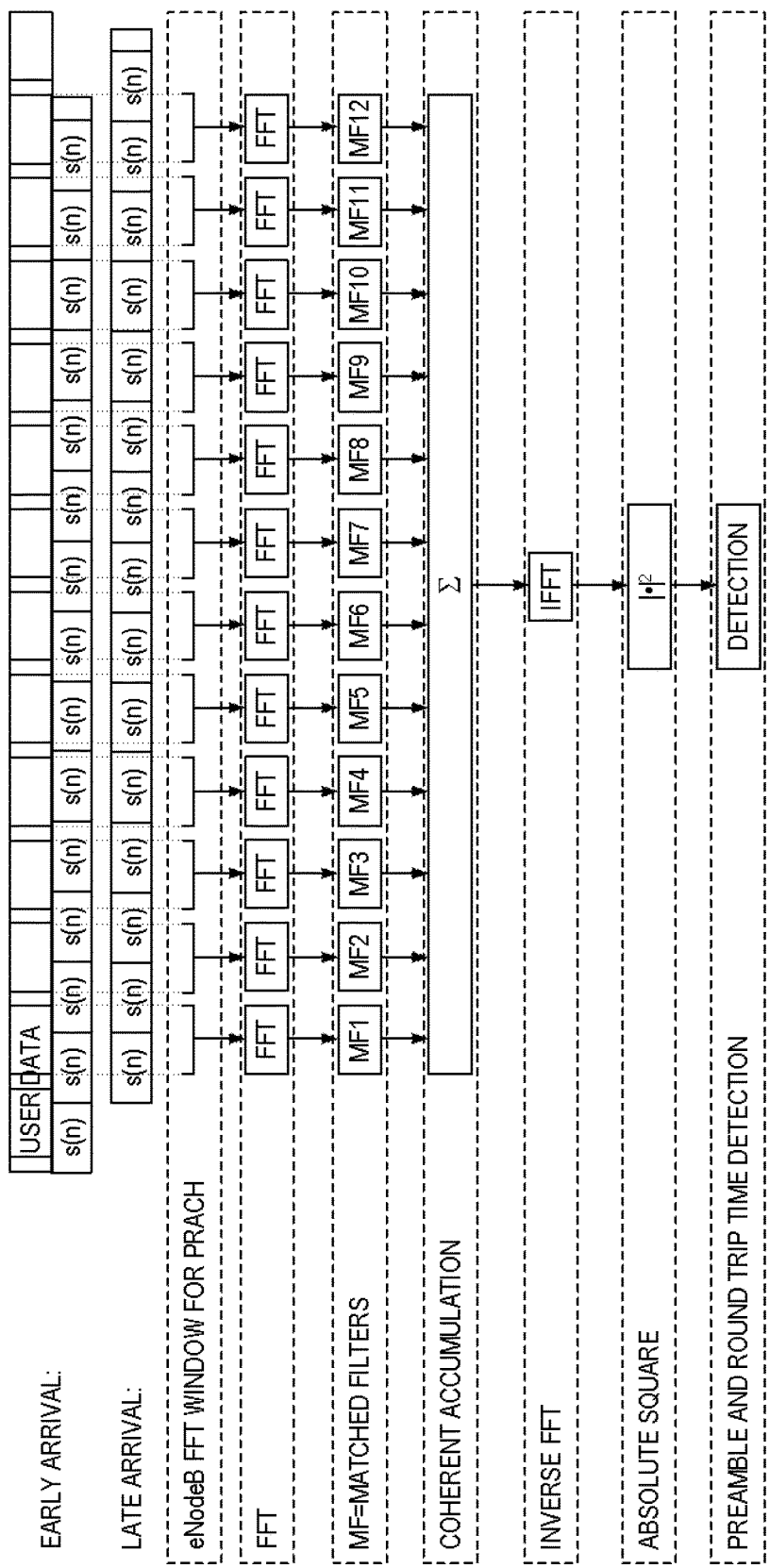
FIG. 2 is a diagram of one model of PRACH signal processing.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Embodiments of the present invention improve the reception, at one or more candidate handover target access nodes 18, 20 in a wireless communication network 10, of an uplink measurement signal transmitted by a UE 22 under handover consideration. The uplink measurement signal comprises a predetermined minimum number of repetitions of a predefined identification sequence. For example, an uplink measurement signal symbol may comprise a Zadoff-Chu sequence. The use of a Zadoff-Chu sequence is beneficial due to its constant amplitude properties, leading to low Peak to Average Power Ratio (PAPR). Also, Zadoff-Chu sequences have good cyclic auto-correlation and cross-correlation properties. Such a sequence is useful in coherent combination to establish timing, as described above with respect to the PRACH signal design. In one embodiment, the predetermined minimum number of (standard-length) symbols is 14, which fills one LTE subframe (1 msec.). In one embodiment, such an uplink measurement signal may be identified as an Uplink Synchronization Signal (USS); however, the more general term "uplink measurement signal (UMS)" is used herein.

According to embodiments of the present invention, the reception of an uplink measurement signal is improved by ensuring that sufficient uplink measurement signal symbols are received; by avoiding interference to the uplink measurement signal by user data (and vice versa); and by minimizing "dead" time unnecessarily allocated to uplink measurement signal reception and from which user data is precluded. These improvements are achieved by innovative design/definition of both an uplink measurement signal reception window at each candidate node 18, 20 and an uplink measurement signal transmission window at the UE 22 under handover consideration. The definition of these windows including the timing of the uplink measurement signal reception window, which depends on a total timing misalignment between the UE 22 and the candidate node 18, 20, and length or duration of either or both the reception and transmission windows, which depends on an uncertainty in the timing misalignment estimate. By configuring the candidate nodes 18, 20 and the UE 22 with reception/transmission windows, respectively, based on the timing misalignment and uncertainty, the best achievable timing match is obtained, such that at least a predetermined minimum number of uplink measurement signal symbols that are transmitted by the UE 22 are received by each candidate node 18, 20 in a dedicated window (on the allocated subband), without interference from user data.

One aspect of embodiments of the present invention that reduces interference and improves scheduling efficiency is the definition of an uplink measurement signal reception window. This is a window, or duration, defined separately for each candidate handover target node (or simply "candidate node") 18, 20 with the granularity of symbol periods rather than subframes. During its uplink measurement signal reception window, a candidate node 18, 20 cannot schedule reception of other data on the allocated subband (but if the subband allocated for uplink measurement signal reception is less than the full uplink carrier then the candidate node 18, 20 can schedule reception of other data simultaneously with the uplink measurement signal reception window on frequencies outside this subband). That is, an uplink measurement signal reception window is defined, in part, as an integral number of symbol periods allocated exclusively to reception of the uplink measurement signal, on the allocated subband. The number of symbol periods in a given uplink measurement signal reception window need not match the number of symbol periods in a subframe (or other predefined frame boundary). Furthermore, the uplink measurement signal reception window need not be aligned with subframe boundaries. Defining the uplink measurement signal reception window in terms of symbol periods, rather than subframes, allows for full utilization of the uplink carrier, as an entire subframe need not be excluded from user data reception.

Another aspect of the definition of an uplink measurement signal reception window that improves efficiency at the candidate node 18, 20 is its timing. The uplink measurement signal reception window comprises an integer number of symbol periods, and is not constrained to subframe boundaries. That is, the uplink measurement signal reception window may "slide," in the time domain, to coincide with the actual reception of uplink measurement signal symbols. The timing of the uplink measurement signal reception window is determined by considering the total timing misalignment between the UE 22 under handover consideration and each candidate node 18, 20. In one embodiment, this timing misalignment, or the worst-case expected timing misalignment, may be estimated based on statistics obtained over many UEs 22 in the relevant part of the network 10. The statistics are preferably continuously or periodically updated. In another embodiment, the timing misalignment may be calculated, with the greatest precision possible, for each pair of UE 22 and candidate node 18, 20.

One component of the total timing misalignment is the propagation time difference from the UE 22 to the different access nodes 16, 18, 20—in particular, the difference in propagation delay between the UE 22 and its serving node 16, and that between the UE 22 and a candidate node 18, 20. In some scenarios, such as network deployments with large Inter-Site Distance (ISD), this propagation delay difference may be the dominant contributor to the total timing misalignment. In cases where the UE position is not precisely known, the (known) distance between the serving node 16 and a candidate node 18, 20 may be used to provide an upper bound for the propagation delay difference component of the total timing misalignment. In cases where the UE location is known, e.g., via Global Navigation Satellite System (GNSS) positioning, the network 10 may compute more exact propagation delay differences from the UE 22 to the source 16 and candidate 18, 20 nodes (as opposed to bounds) for a given UE 22 and source/candidate node 16, 18, 20.

Another component of the total timing misalignment is inter-node timing synchronization inaccuracies. In some scenarios, these are the dominant contributor to the total timing misalignment. In one embodiment, network access nodes 16, 18, 20 (e.g., serving and candidate nodes) maintain, or are able to obtain as needed, an absolute timing reference, such as a GNSS-based Coordinated Universal Time (UTC). Using known time-stamped message exchange approaches, the source 16 and candidate 18, 20 nodes can identify the timing offset between each relevant access node pair, with the accuracy limited by the accuracy by which the message propagation delay can be known or measured. In the absence of an absolute timing reference, an access node pair can still estimate their mutual synchronization difference through exchanges of messages with timing information, combined with round trip time measurements on the message exchanges. In another embodiment, if the exact synchronization offset cannot be estimated, the inter-access node synchronization tolerance (typical or worst-case offset) may be known, based on the network architecture and the particular hardware used. The tolerance figure can then be used to define an upper bound for the inter-node timing synchronization inaccuracy component of the total timing misalignment. Methods for estimating the inter-node timing synchronization inaccuracy are disclosed in International Patent Application WO 2016/072886, "Synchronization Assistance to a Mobile Station," published 12 May 2016, assigned to the assignee of the present application, the disclosure of which is incorporated herein by reference in its entirety.

The propagation delay difference, the inter-node timing synchronization inaccuracy, and any other sources of timing inaccuracy are added together to yield the total timing misalignment between the UE 22 under handover consideration and a particular candidate node 18, 20. The total timing misalignment is then used to determine the timing of the uplink measurement signal reception window at that candidate node 18, 20. In one embodiment, the timing of the uplink measurement signal reception window refers to the center of the window, although any other point (e.g., the beginning or end of the window) may alternatively be used.

Another aspect of the definition of an uplink measurement signal reception window that improves efficiency at the candidate node 18, 20 is its length, or duration, which is based on an uncertainty of the total timing misalignment estimate. The length of the uplink measurement signal reception window is nominally a predetermined minimum number of symbol periods (e.g., 14 standard-length symbol periods, to fill one LTE subframe). However, where only upper bounds on various components of the total timing misalignment are used (as opposed to precise measurements/calculations), the degree of uncertainty in the total timing misalignment estimate is quantified. Symbol periods are then added to the uplink measurement signal reception window, i.e., by prepending and/or appending symbol periods. This results in a greater number of symbol periods being reserved, within the allocated subband, for reception of the uplink measurement signal; the scheduling of user data in these symbol periods is precluded. The resolution of the uplink measurement signal reception window timing and/or duration adjustment is preferably one symbol, or alternatively two or more symbols. Symbol periods not allocated to the uplink measurement signal reception window are available for the candidate node to schedule the reception of other data (or downlink data, in dynamic Time Division Duplex, or TDD, systems). Note that other data may also be scheduled during the uplink measurement signal reception window outside of the subband allocated for the uplink measurement signal.

Note also that, if any number of symbols normally available for other data reception are blocked—i.e., in this case by the uplink measurement signal reception window reservation (within the relevant subband)—the subframe is reduced, from the perspective of scheduling the other data. This means the set of possible rate matching and Resource Element (RE) mapping configurations is also reduced. Accordingly, an appropriate configuration must be selected, from the reduced set, that fits with the available number of symbols.

Another aspect of embodiments of the present invention that reduces interference and improves scheduling efficiency is the definition of an uplink measurement signal transmission window for the UE 22 under handover consideration—in particular, its length, or duration, which is based on the uncertainty of the total timing misalignment estimate. The length of the uplink measurement signal transmission window is nominally a predetermined minimum number of symbol periods (e.g., 14 standard-length symbol periods to fill one LTE subframe), and it is transmitted at a timing determined by the UE's serving node 16 (e.g., during one subframe, on an allocated subband). As described above, the timings of an uplink measurement signal reception window at the various candidate nodes are set based on the total timing misalignment between the UE 22 and each respective candidate node 18, 20.

In one embodiment, rather than adjust the length of each uplink measurement signal reception window based on the uncertainty of the total timing misalignment estimate for the respective candidate node 18, 20, the uplink measurement signal reception windows are the standard length (i.e., the predetermined minimum number of symbol periods), and the length of the uplink measurement signal transmission window at the UE 22 is adjusted. In particular, uplink measurement signal symbols (all of which encode the same predetermined identification sequence) are prepended and/or appended to the uplink measurement signal as necessary to encompass all of the uplink measurement signal reception windows. That is, the duration of the uplink measurement signal transmission window covers a span, within which fall the full standard-size uplink measurement signal reception windows for all relevant candidate nodes 18, 20. In this manner, each candidate node 18, 20 need only reserve the predetermined minimum number of symbol periods, within the allocated subband, for uplink measurement signal reception, thus maximizing the number of symbol periods left available for other data. The expanded uplink measurement signal transmission window ensures that no candidate node 18, 20 misses any uplink measurement signal symbols due to its uplink measurement signal reception window being shifted, relative to other candidate nodes, due to total timing misalignment between the UE 22 and that candidate node 18, 20.

In one embodiment, both the timing and the duration of each uplink measurement signal reception window are adjusted, based on the total timing misalignment and uncertainty in the timing misalignment estimate, respectively, for each candidate node 18, 20, and the uplink measurement signal transmission window comprises the predetermined minimum duration. In another embodiment, only the timing of each uplink measurement signal reception window is adjusted, based on the total timing misalignment, for each candidate node 18, 20, and the duration of the uplink measurement signal transmission window is adjusted based on an uncertainty in each total timing misalignment estimate, to encompass all of the uplink measurement signal reception windows. In yet another embodiment, the duration of both an uplink measurement signal reception window, for one or more candidate nodes 18, 20, and the uplink measurement signal transmission window may be adjusted, based on uncertainties in the total timing misalignment estimates for the various candidate nodes.

Figure 3:
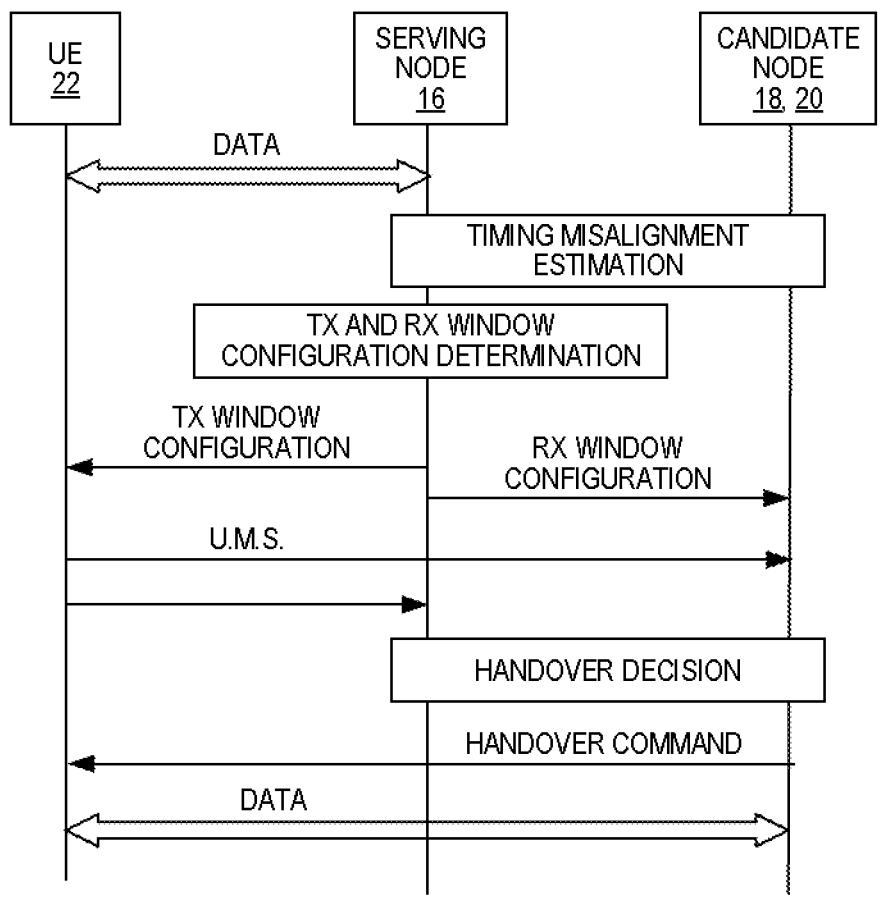
FIG. 3 is a signaling diagram of a serving node configuring both a candidate node and a UE for uplink measurement signal transmission/reception.

FIG. 3 depicts a scenario according to one embodiment, in which the serving node 16 performs timing measurements/calculations, and configures the candidate nodes 18, 20 and the UE 22. In particular, for each candidate node 18, 20, the serving node 16 of the UE 22 under handover consideration performs the total timing misalignment measurements and calculations, defines the timing and possibly duration for the uplink measurement signal reception window, and transmits this information to the candidate node 18, 20. This transmission may employ inter-access node signaling, either proprietary or standardized X2AP messaging (or some other, perhaps yet-to-be-standardized protocol for inter-node control signaling, e.g., for 5G New Radio). In one embodiment, the serving node 16 also defines the timing and duration of the uplink measurement signal transmission window, and transmits this information to the UE 22. This transmission may employ Radio Resource Control (RRC) signaling or lower layer signaling, such as Media Access Control (MAC) layer signaling. As another alternative, a list of uplink measurement signal transmission window configuration options may be previously provided to the UE 22 via RRC (dedicated signaling or in the form of broadcast system information), or hardcoded based on standards, and an index to one of these options may be signaled to the UE 22 via lower-layer signaling. Also, the serving node's 16 configuration of the candidate nodes 18, 20 and the UE 22 may occur in any order, or simultaneously. Once all configurations are complete, the UE 22 transmits an uplink measurement signal, which all candidate nodes 18, 20 receive and use to perform signal quality and timing measurements. A handover decision is then made, and the handover operation executed. To support the handover decision, the candidate nodes will typically send their respective measurement results to the serving node, which uses these results as the basis for the handover decision and selection of target node.

In other embodiments, the timing measurements and calculations, and/or the uplink measurement signal reception/transmission window definitions may be distributed. For example, each candidate node 18, 20 may calculate its own total timing misalignment with the UE 22, and the uncertainty in that estimate. The candidate nodes 18, 20 may report this information to the serving node 16 for definition of the uplink measurement signal reception windows (particularly where the uplink measurement signal transmission window duration is adjusted to accommodate the uncertainty), or each candidate node 18, 20 may define its own uplink measurement signal reception window (i.e., timing and possibly duration). Similarly, the serving node 16 may define the uplink measurement signal transmission window and transmit the information to the UE 22, as described above. The uplink measurement signal transmission window duration may be conveyed as a time duration, or as a number of symbol periods. Alternatively, the serving node 16 may transmit to the UE 22 the timings of the uplink measurement signal reception windows of the various candidate nodes 18, 20 and the uplink measurement signal transmission window timing, leaving the UE 22 to calculate the uplink measurement signal transmission window duration (i.e., the number of symbols to add so as to encompass all uplink measurement signal reception windows). In general, the various timing measurements, estimates, and calculations, and the reception/transmission window definitions, may be performed by any of the serving node 16, candidate node 18, 20, or UE 22, as required or desired for any particular implementation.

Figure 4:
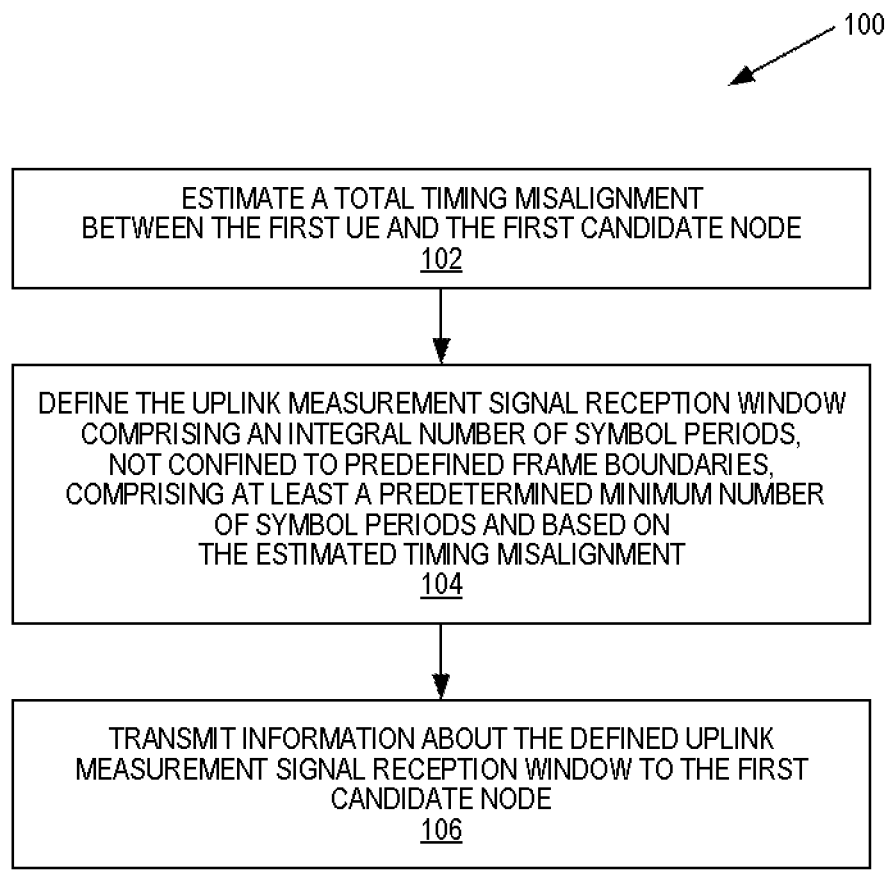
FIG. 4 is a flow diagram of a method, by a serving node, of defining an uplink measurement signal reception window for a first candidate node.

FIG. 4 depicts the steps of a method 100, performed by a serving node 16, of defining an uplink measurement signal reception window for a first candidate node 18, 20. The serving node 16 estimates a total timing misalignment between the first UE 22 and the first candidate node 18, 20 (block 102), which may for example comprise a propagation delay difference component and an inter-node synchronization inaccuracy component. The serving node 16 defines the uplink measurement signal reception window (block 104). The uplink measurement signal reception window comprises an integral number of symbol periods, and is not confined to predefined frame boundaries. It comprises at least a predetermined minimum number of symbol periods, and the timing of the window is based on the estimated total timing misalignment. The serving node transmits information about the defined uplink measurement signal reception window to the first candidate node 18, 20 (block 106). In some embodiments, the serving node 16 may additionally adjust the duration of the uplink measurement signal reception window based on an uncertainty in the total timing misalignment estimate.

Figure 5:
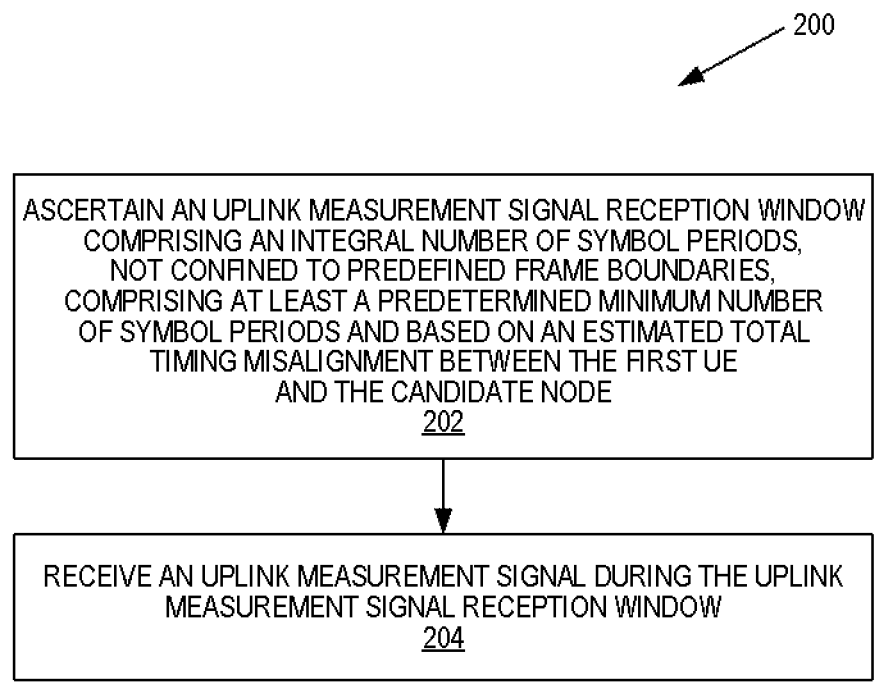
FIG. 5 is a flow diagram of a method, by a candidate node, of receiving an uplink measurement signal from a UE under handover consideration.

FIG. 5 depicts a method 200, performed by a candidate node 18, 20, of receiving an uplink measurement signal from a first UE 22 under handover consideration. The candidate node 18, 20 ascertains an uplink measurement signal reception window (block 202). The uplink measurement signal reception window comprises an integral number of symbol periods, and is not confined to predefined frame boundaries. It comprises at least a predetermined minimum number of symbol periods, and the timing of the window is based on an estimated total timing misalignment between the first UE 22 and the candidate node 18, 20. The candidate node 18, 20 may ascertain the uplink measurement signal reception window by receiving its definition (timing, and possibly also duration) from the serving node 16, or it may receive instructions and/or some information from the serving node 16, and it may measure/calculate a total timing misalignment (and possibly also an uncertainty in the total timing misalignment estimate). The serving node 18, 20 then receives an uplink measurement signal during the uplink measurement signal reception window (block 204).

Figure 6:
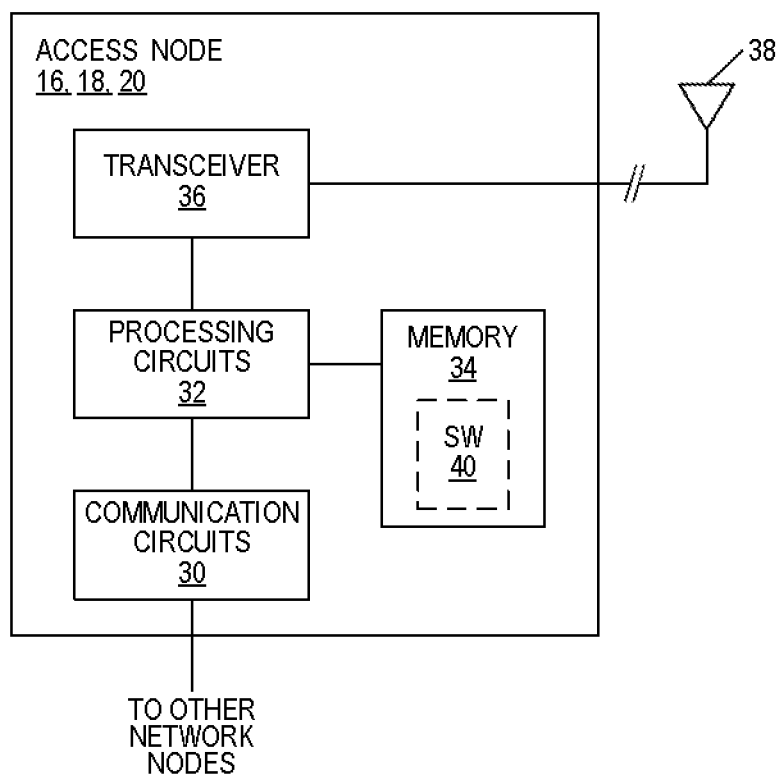
FIG. 6 is a block diagram of a network access node, which may be a serving node or a candidate handover target node.

FIG. 6 is a block diagram of an access node 16, 18, 20 operative in a wireless communication network 10, which may be a serving node 16 or a candidate node 18, 20 for a particular UE 22 at a particular time. The access node 16, 18, 20 includes communication circuits 30 operative to exchange data with other network nodes; processing circuitry 32; memory 34; and radio circuits, such as a transceiver 36, one or more antennas 38, and the like, to effect wireless communication across an air interface to one or more UEs 22. As indicated by the broken connection to the antenna(s) 38, the antenna(s) 38 may be physically located separately from the access node 16, 18, 20, such as mounted on a tower, building, or the like. Although the memory 34 is depicted as being separate from the processing circuitry 32, those of skill in the art understand that the processing circuitry 32 includes internal memory, such as a cache memory or register file. Those of skill in the art additionally understand that virtualization techniques allow some functions nominally executed by the processing circuitry 32 to actually be executed by other hardware, perhaps remotely located (e.g., in the so-called "cloud").

According to embodiments of the present invention, the memory 34 is operative to store, and the processing circuitry 32 is operative to execute, software 40 which when executed is operative to cause the access node 16, 18, 20 to define an uplink measurement signal reception window, as described and claimed herein. In particular, the software 40, when executed on the processing circuitry 32, is operative to perform the method 100 described and claimed herein when the access node 16, 18, 20 is a serving node 16, and to perform the method 200 described and claimed herein when the access node 16, 18, 20 is a candidate node 18, 20. This allows the access node 16, 18, 20 to improve uplink measurement signal reception, reduce interference with user data, and improve efficiency by utilizing all available candidate node 18, 20 resources for the reception of user data.

Figure 7:
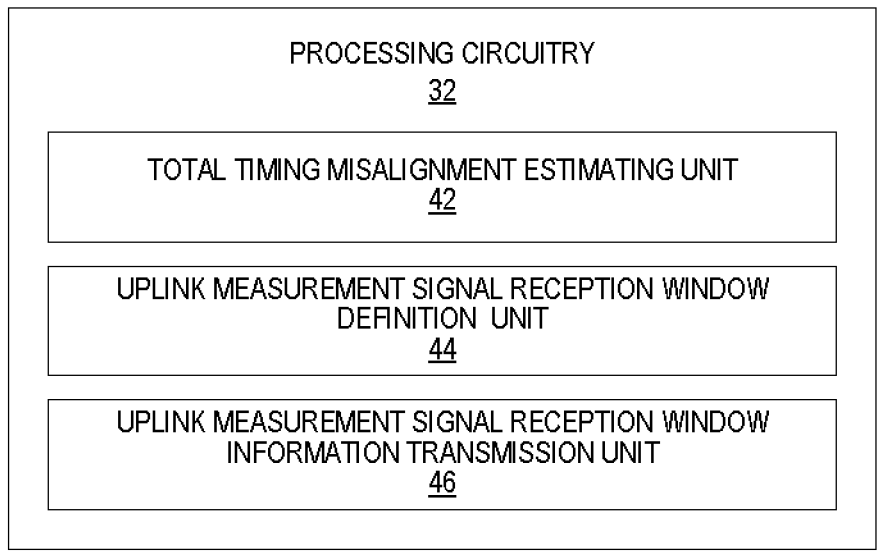
FIG. 7 is a diagram of physical units in processing circuitry in the access node of FIG. 6 when the access node is a serving node.

FIG. 7 illustrates example processing circuitry 32, such as that in the access node 16, 18, 20 of FIG. 6 when the node 16 is serving a UE 22 under handover consideration. The processing circuitry 32 comprises a plurality of physical units. In particular, the processing circuitry 32 comprises a total timing misalignment estimating unit 42, an uplink measurement signal reception window definition unit 44, and an uplink measurement signal reception window information transmission unit 46. The total timing misalignment estimating unit 42 is configured to estimate a total timing misalignment between a UE 22 under handover consideration and a candidate node 18, 20. The uplink measurement signal reception window definition unit 52 is configured to define an uplink measurement signal reception window comprising an integral number of symbol periods, not confined to predefined frame boundaries, comprising at least a predetermined minimum number of symbol periods and based on the estimated timing misalignment. The uplink measurement signal reception window information transmission unit 46 is configured to transmit information about the defined uplink measurement signal reception window to the candidate node 18, 20.

Figure 8:
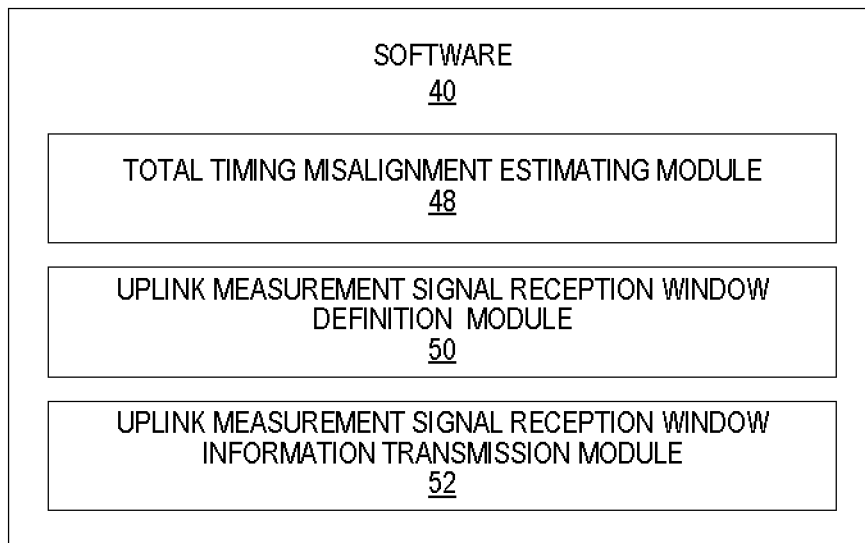
FIG. 8 is a diagram of software modules in memory in the access node of FIG. 6 when the access node is a serving node.

FIG. 8 illustrates example software 40, such as that depicted in the memory 34 of the access node 16, 18, 20 of FIG. 6 when the node 16 is serving a UE 22 under handover consideration. The software 40 comprises a plurality of software modules. In particular, the software 40 comprises a total timing misalignment estimating module 48, an uplink measurement signal reception window definition module 50, and an uplink measurement signal reception window information transmission module 52. The total timing misalignment estimating module 42 is configured to cause the processing circuitry 32 to estimate a total timing misalignment between a UE 22 under handover consideration and a candidate node 18, 20. The uplink measurement signal reception window definition module 52 is configured cause the processing circuitry 32 to define an uplink measurement signal reception window comprising an integral number of symbol periods, not confined to predefined frame boundaries, comprising at least a predetermined minimum number of symbol periods and based on the estimated timing misalignment. The uplink measurement signal reception window information transmission module 46 is configured to cause the processing circuitry 32 to transmit information about the defined uplink measurement signal reception window to the candidate node 18, 20.

Figure 9:
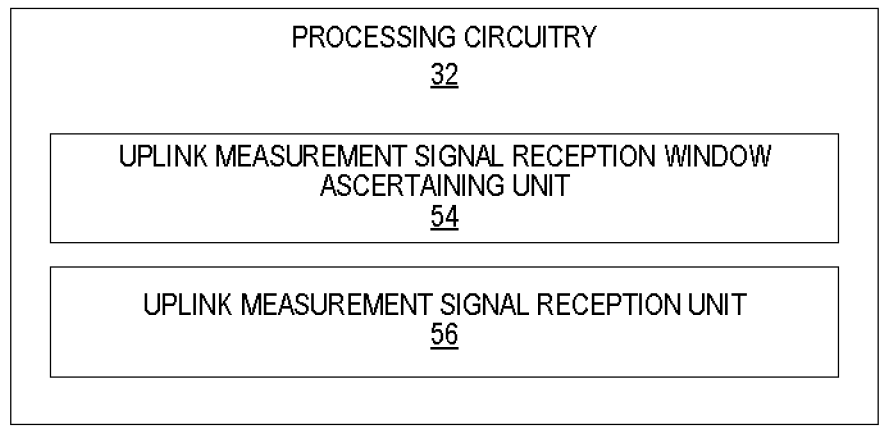
FIG. 9 is a diagram of physical units in processing circuitry in the access node of FIG. 6 when the access node is a candidate node.

FIG. 9 illustrates example processing circuitry 32, such as that in the access node 16, 18, 20 of FIG. 6 when the node 18, 20 is a candidate handover target for a UE 22 under handover consideration. The processing circuitry 32 comprises a plurality of physical units. In particular, the processing circuitry 32 comprises an uplink measurement signal reception window ascertaining unit 54 and an uplink measurement signal reception unit 56. The uplink measurement signal reception window ascertaining unit 54 is configured to ascertain an uplink measurement signal reception window comprising an integral number of symbol periods, not confined to predefined frame boundaries, comprising at least a predetermined minimum number of symbol periods and based on an estimated total timing misalignment between the UE 22 and the candidate node 18, 20. The uplink measurement signal reception unit 56 is configured to receive an uplink measurement signal during the uplink measurement signal reception window.

Figure 10:
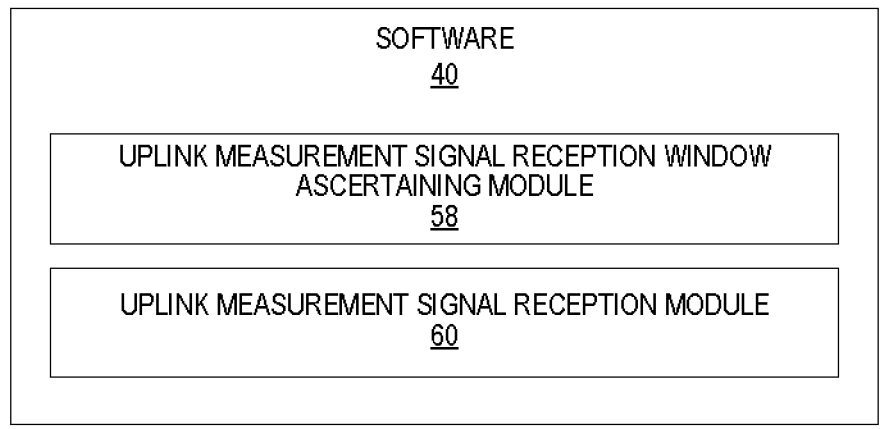
FIG. 10 is a diagram of software modules in memory in the access node of FIG. 6 when the access node is a candidate node.

FIG. 10 illustrates example software 40, such as that depicted in the memory 34 of the access node 16, 18, 20 of FIG. 6 when the node 18, 20 is a candidate handover target for a UE 22 under handover consideration. The software 40 comprises a plurality of software modules. In particular, the software 40 comprises an uplink measurement signal reception window ascertaining module 58 and an uplink measurement signal reception module 60. The uplink measurement signal reception window ascertaining module 58 is configured to ascertain an uplink measurement signal reception window comprising an integral number of symbol periods, not confined to predefined frame boundaries, comprising at least a predetermined minimum number of symbol periods and based on an estimated total timing misalignment between the UE 22 and the candidate node 18, 20. The uplink measurement signal reception module 60 is configured to receive an uplink measurement signal during the uplink measurement signal reception window.

Figure 11:
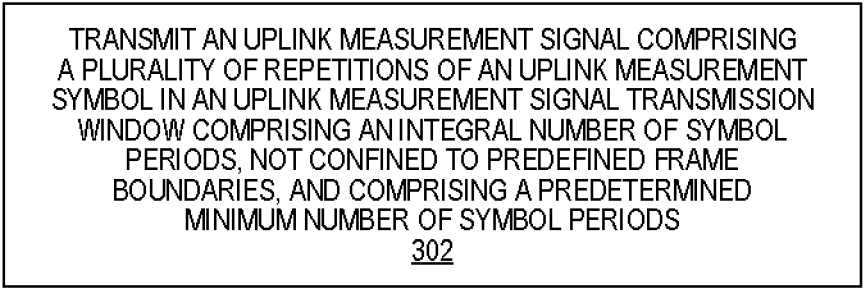
FIG. 11 is a flow diagram of a method, by a UE, of transmitting an uplink measurement signal to a plurality of candidate nodes.

FIG. 11 depicts the single step of a method 300, performed by a UE 22, of transmitting an uplink measurement signal to a plurality of candidate nodes 18, 20. The UE 22 transmits an uplink measurement signal comprising a plurality of repetitions of an uplink measurement symbol in an uplink measurement signal transmission window. The uplink measurement signal transmission window comprises an integral number of symbol periods and is not confined to predefined frame boundaries. It comprises a predetermined minimum number of symbol periods (block 304). In embodiments where the uncertainty in the total timing misalignment estimate is accounted for by adjusting the duration (as well as timing) of uplink measurement signal reception windows, the uplink measurement signal transmission window comprises the predetermined minimum number of symbol periods. In embodiments where the uplink measurement signal reception windows all have the duration defined by the predetermined minimum number of symbol periods, uncertainty in the total timing misalignment estimate is accounted for by adjusting the duration of the uplink measurement signal transmission window. In particular, repetitions of the uplink measurement signal symbol are added until the duration of the uplink measurement signal encompasses all of the uplink measurement signal reception windows at all candidate nodes 18, 20.

Figure 12:
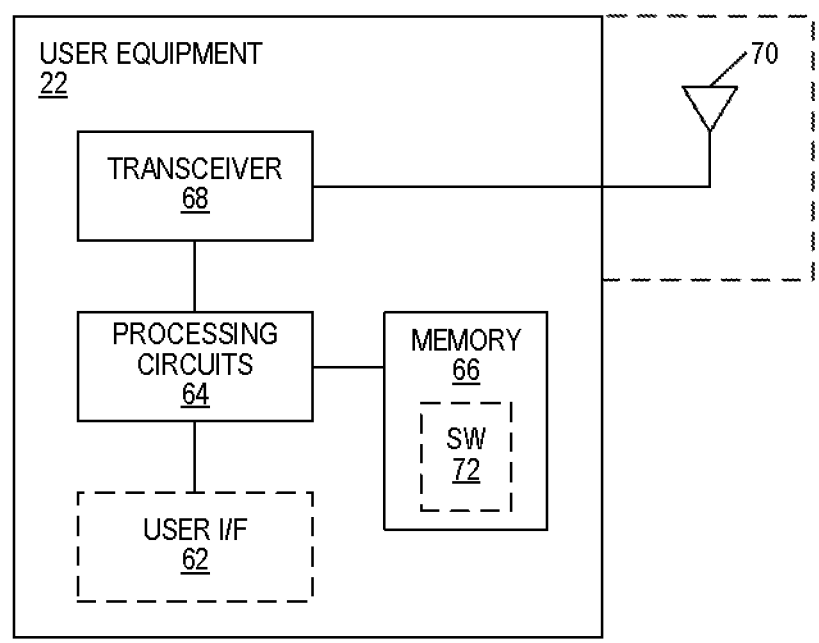
FIG. 12 is a block diagram of a UE.

FIG. 12 is a block diagram of a UE 22 operative in embodiments of the present invention. A UE 22 is any type device capable of communicating with an access node 16, 18, 20 over radio signals. A UE 22 may therefore refer to a cellphone, smartphone, machine-to-machine (M2M) device, a machine-type communications (MTC) device, a Narrowband Internet of Things (NB-IoT) device, etc. A UE 22 may also be referred to as a radio device, a radio communication device, a wireless communication device, a wireless terminal, or simply a terminal—unless the context indicates otherwise, the use of any of these terms is intended to include device-to-device UEs or devices, machine-type devices or devices capable of machine-to-machine communication, sensors equipped with a radio network device, wireless-enabled table computers, mobile terminals, smart phones, laptop-embedded equipped (LEE), laptop-mounted equipment (LME), USB dongles, wireless customer-premises equipment (CPE), etc.

A UE 22 as described herein may be, or may be comprised in, a machine or device that performs monitoring or measurements, and transmits the results of such monitoring measurements to another device or a network. Particular examples of such machines are power meters, industrial machinery, or home or personal appliances, e.g., refrigerators, televisions, personal wearables such as watches etc. In other scenarios, a UE 22 as described herein may be comprised in a vehicle and may perform monitoring and/or reporting of the vehicle's operational status or other functions associated with the vehicle.

In some embodiments, the UE 22 includes a user interface 62 (display, touchscreen, keyboard or keypad, microphone, speaker, and the like); in other embodiments, such as in many M2M, MTC, or NB-IoT scenarios, the UE 22 may include only a minimal, or no, user interface 62 (as indicated by the dashed lines of block 32 in FIG. 12). The UE 22 also includes processing circuitry 64; memory 66; and radio circuits, such a transceiver 68, one or more antennas 70, and the like, to effect wireless communication across an air interface to one or more access nodes 16, 18, 20. As indicated by the dashed lines, the antenna(s) 70 may protrude externally from the UE 22, or the antenna(s) 70 may be internal.

According to embodiments of the present invention, the memory 66 is operative to store, and the processing circuitry 64 operative to execute, software 72 which when executed is operative to cause the UE 22 to transmit an uplink measurement signal in an uplink measurement signal transmission window, as described and claimed herein. In particular, the software 72, when executed on the processing circuitry 64, is operative to perform the method 300 described and claimed herein. This allows the UE 22 to transmit an uplink measurement signal in such a way that its reception at candidate nodes 18, 20 and their overall reception efficiency is enhanced, and interference is reduced.

Figure 13:
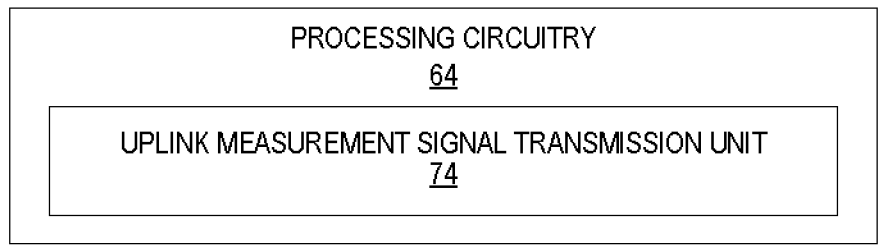
FIG. 13 is a diagram of physical units in processing circuitry in the UE of FIG. 12.

FIG. 13 illustrates example processing circuitry 64, such as that in the UE 22 of FIG. 12. The processing circuitry 64 comprises one physical unit. In particular, the processing circuitry 64 comprises an uplink measurement signal transmission unit 74. The uplink measurement signal transmission unit 74 is configured to transmit an uplink measurement signal comprising a plurality of repetitions of an uplink measurement symbol in an uplink measurement signal transmission window comprising an integral number of symbol periods, not confined to predefined frame boundaries, and comprising a predetermined minimum number of symbol periods.

Figure 14:
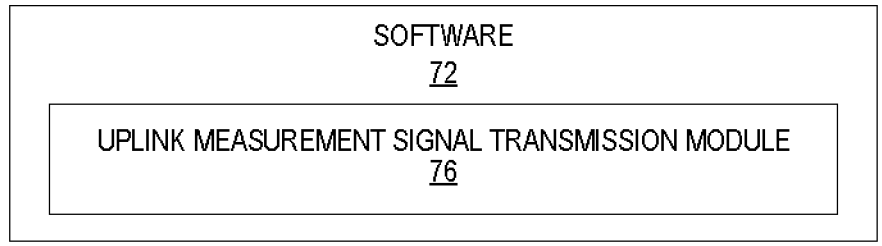
FIG. 14 is a diagram of software modules in memory in the UE of FIG. 12.

FIG. 14 illustrates example software 72, such as that depicted in the memory 66 of the UE 22 of FIG. 12. The software 72 comprises a single software module. In particular, the software 72 comprises an uplink measurement signal transmission module 76. The uplink measurement signal transmission module 76 is configured to transmit an uplink measurement signal comprising a plurality of repetitions of an uplink measurement symbol in an uplink measurement signal transmission window comprising an integral number of symbol periods, not confined to predefined frame boundaries, and comprising a predetermined minimum number of symbol periods.

In all embodiments, the processing circuitry 32, 64 may comprise any sequential state machine operative to execute machine instructions stored as machine-readable computer programs in memory 34, 66, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

In all embodiments, the memory 34, 66 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the radio circuits may comprise one or more transceivers 36, 68 used to communicate with one or more other transceivers via a Radio Access Network (RAN) according to one or more communication protocols known in the art or that may be developed, such as IEEE 802.xx, CDMA, WCDMA, GSM, LTE, UTRAN, WiMax, NB-IoT, or the like. The transceiver 36, 68 implements transmitter and receiver functionality appropriate to the RAN links (e.g., frequency allocations and the like). The transmitter and receiver functions may share circuit components and/or software, or alternatively may be implemented separately.

In all embodiments, the communication circuits 30 may comprise a receiver and transmitter interface used to communicate with one or more other nodes over a communication network according to one or more communication protocols known in the art or that may be developed, such as Ethernet, TCP/IP, SONET, ATM, IMS, SIP, or the like. The communication circuits 30 implement receiver and transmitter functionality appropriate to the communication network links (e.g., optical, electrical, and the like). The transmitter and receiver functions may share circuit components and/or software, or alternatively may be implemented separately.

FIG. 15 illustrates a plurality of modules comprising a virtual function module architecture of a serving node comprising an access node 16 in a wireless communication network 10 providing service to a UE 22 operative in the network 10. A first module 78 is configured to estimate a total timing misalignment between a UE 22 and a candidate node 18, 20 comprising an access node 18, 20 in the network 10 that is a candidate target for handing over the UE 22. A second module 80 is configured to define an uplink measurement signal reception window comprising an integral number of symbol periods, not confined to predefined frame boundaries, comprising at least a predetermined minimum number of symbol periods and based on the estimated timing misalignment. A third module 82 is configured to transmit information about the defined uplink measurement signal reception window to the candidate node 18, 20.

FIG. 16 illustrates a plurality of modules comprising a virtual function module architecture of a candidate node 18, 20 comprising an access node 18, 20 in a wireless communication network 10 that is a candidate target for handing over the UE 22 from an access node 16 in network 10 providing service to a UE 22 operative in the network 10. A first module 84 is configured to ascertain an uplink measurement signal reception window comprising an integral number of symbol periods, not confined to predefined frame boundaries, comprising at least a predetermined minimum number of symbol periods and based on an estimated total timing misalignment between the first UE and the candidate node. A second module 86 is configured to receive an uplink measurement signal during the uplink measurement signal reception window.

FIG. 17 illustrates a module comprising a virtual function module architecture of a UE 22 operative in a wireless communication network 10, and being served by a serving node 16 comprising an access node 16 in the network 10 providing service to the UE 22. The module 88 is configured to transmit an uplink measurement signal comprising a plurality of repetitions of an uplink measurement symbol in an uplink measurement signal transmission window comprising an integral number of symbol periods, not confined to predefined frame boundaries, and comprising a predetermined minimum number of symbol periods.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The appended claims—appended hereto in a separate section of the application identified by the header CLAIMS—define the matter for which protection is sought. The following items represent concise technical and legal descriptions of various embodiments of the invention:

Item 1. A method (200), performed by a candidate node (18, 20) comprising an access node (16, 18, 20) in a wireless communication network (10) that is a candidate target for handing over a first User Equipment, UE (22), from a serving node (16) comprising a different access node (16, 18, 20) in the network (10) providing service to the first UE (22), of receiving an uplink measurement signal from the first UE (22), comprising:
 ascertaining (202) an uplink measurement signal reception window comprising an integral number of symbol periods, not confined to predefined frame boundaries, comprising at least a predetermined minimum number of symbol periods and based on an estimated total timing misalignment between the first UE (22) and the candidate node (18, 20); and
 receiving (204) an uplink measurement signal during the uplink measurement signal reception window.

Item 2. The method (200) of item 1 wherein ascertaining the uplink measurement signal reception window comprises receiving information from the serving node (16) regarding the timing of the uplink measurement signal reception window.

Item 3. The method (200) of claim 1 wherein ascertaining the uplink measurement signal reception window comprises:
 estimating a total timing misalignment between the first UE (22) and the candidate node (18, 20); and
 defining the uplink measurement signal reception window based on the estimated timing misalignment.

Item 4. The method (200) of item 3 wherein estimating a total timing misalignment between the first UE (22) and the candidate node (18, 20) comprises:
 estimating a timing misalignment between the serving node (16) and the candidate node (18, 20);
 estimating a difference in a propagation delay between the UE (22) and the candidate node (18, 20), and between the UE (22) and the serving node (16); and
 summing the node-to-node timing misalignment and the propagation delay difference to yield a total timing misalignment between the UE (22) and the candidate node (18, 20).

Item 5. The method (200) of any of items 1-4 wherein the uplink measurement signal reception window is further based on an uncertainty in the estimated total timing misalignment between the first UE (22) and the candidate node (18, 20).

Item 6. The method (200) of item 5 wherein ascertaining the uplink measurement signal reception window comprises receiving information from the serving node (16) regarding both a timing and duration of the uplink measurement signal reception window.

Item 7. The method (200) of item 5 further comprising ascertaining an uncertainty in the estimated total timing misalignment; and
 wherein defining the uplink measurement signal reception window based on the estimated timing misalignment and the uncertainty comprises:
  defining a timing of the uplink measurement signal reception window based on the estimated total timing misalignment; and
  defining a number of symbol periods for the uplink measurement signal reception window in excess of the predetermined minimum number of symbol periods based on the uncertainty in the estimated total timing misalignment.

Item 8. The method (200) of item 7 wherein ascertaining an uncertainty in the estimated total timing misalignment comprises
 ascertaining an uncertainty in the node-to-node timing misalignment based on an uncertainty in the delay of singling between the serving node (16) and the candidate node (18, 20); and
 ascertaining an uncertainty in the propagation delay difference based on an uncertainty in the location of the UE (22); and
 summing the uncertainty in the node-to-node timing misalignment and the uncertainty in the propagation delay difference to yield an overall uncertainty in the estimated total timing misalignment between the UE (22) and the candidate node (18, 20);
 wherein defining a number of symbol periods for the uplink measurement signal reception window based on the uncertainty comprises defining a number of symbol periods for the uplink measurement signal reception window based on the overall uncertainty.

Item 9. The method (200) of any of items 7-8 wherein:
 ascertaining the uncertainty in the estimated total timing misalignment comprises ascertaining a worst-case uncertainty; and
 defining a number of symbol periods for the uplink measurement signal reception window based on the uncertainty comprises defining a number of symbol periods for the uplink measurement signal reception window based on the worst-case uncertainty.

Item 10. The method (200) of item 1 further comprising:
 ascertaining a subband of an uplink carrier on which the uplink measurement signal will be transmitted; and
 wherein receiving an uplink measurement signal comprises receiving the uplink measurement signal during the uplink measurement signal reception window on the subband.

Item 11. The method (200) of item 10 wherein ascertaining a subband of an uplink carrier on which the uplink measurement signal will be transmitted comprises receiving from the serving node (16) information identifying the subband.

Item 12. The method (200) of any of items 10-11 further comprising:
not scheduling reception of user data in the subband used by the uplink measurement signal in any symbol period included in the uplink measurement signal reception window definition.

Item 13. The method (200) of any of claims 10-12 further comprising scheduling reception of user data in one or both of:
any symbol period not included in the uplink measurement signal reception window definition; and
one or more symbol periods included in the uplink measurement signal reception but not in the subband used by the uplink measurement signal.

Item 14. The method (200) of item 1 further comprising:
coherently combining at least the predetermined number of received uplink measurement signal symbols; and
calculating at least one of a precise timing estimate and signal quality estimate for the first UE (22) based on the received uplink measurement signal.

Item 15. The method (200) of item 14 wherein coherently combining at least the predetermined number of received uplink measurement signal symbols comprises:
independently converting each received uplink measurement signal symbol to the frequency domain;
applying a matched filter to each frequency domain symbol to detect uplink measurement signal sequences;
accumulating the matched filter outputs over the duration of the predetermined number of uplink measurement signal symbol periods;
converting the accumulated output to the time domain; and
processing the time domain data to detect a peak, the delay of which corresponds to a timing error.

Item 16. The method (200) of any of items 1-15 wherein the uplink measurement signal is an Uplink Synchronization Signal, USS, comprising repetition of a predetermined sequence in at least a predetermined minimum number of contiguous symbols.

Item 17. A method (300), performed by a User Equipment, UE (22), in a wireless communication network (10), of transmitting an uplink measurement signal to a plurality of candidate nodes (18, 20), each comprising a different access node (16, 18, 20) in the network (10) that is a candidate target for handing over the UE (22) from a serving node (16) comprising an access node (16, 18, 20) in the network (10) different from any candidate node (18, 20) and providing service to the UE (22), comprising:
transmitting (302) an uplink measurement signal comprising a plurality of repetitions of an uplink measurement symbol in an uplink measurement signal transmission window comprising an integral number of symbol periods, not confined to predefined frame boundaries, and comprising a predetermined minimum number of symbol periods.

Item 18. The method (300) of item 17 wherein
each candidate node (18, 20) has an independent uplink measurement signal reception window, a timing of the window based on a total timing misalignment between the UE (22) and the candidate node (18, 20), and a duration of the window based on an uncertainty in the estimated total timing misalignment; and
the uplink measurement signal transmission window comprises the predetermined minimum number of symbol periods.

Item 19. The method (300) of item 18 further comprising:
receiving timing information for the uplink measurement signal transmission window from the serving node (16); and
transmitting the uplink measurement signal during the uplink measurement signal transmission window at the calculated timing.

Item 20. The method (300) of item 18 further comprising:
receiving at least timing information for the uplink measurement signal reception window for each candidate node (18, 20) from the serving node (16);
calculating the timing of the uplink measurement signal transmission window based on the timing information for the uplink measurement signal reception window for each candidate node (18, 20); and
transmitting the uplink measurement signal during the uplink measurement signal transmission window at the calculated timing.

Item 21. The method (300) of item 17 wherein
each candidate node (18, 20) has an uplink measurement signal reception window of the same duration, but with possibly different timing based on a total timing misalignment between the UE (22) and the candidate node (18, 20); and
the uplink measurement signal transmission window comprises an integral number of contiguous symbol periods sufficient to encompass the uplink measurement signal reception windows defined for all candidate nodes (18, 20).

Item 22. The method (300) of item 21 further comprising:
receiving information defining the uplink measurement signal transmission window from the serving node (16); and
transmitting the uplink measurement signal during the uplink measurement signal transmission window according to the received information.

Item 23. The method (300) of item 22 wherein information defining the uplink measurement signal transmission window includes the duration of the uplink measurement signal transmission window.

Item 24. The method (300) of item 22 wherein information defining the uplink measurement signal transmission window duration includes the number of symbol periods in the uplink measurement signal transmission window.

Item 25. The method (300) of item 21 further comprising:
receiving timing information for the uplink measurement signal reception window for each candidate node (18, 20) from the serving node (16);
calculating the timing and duration of the uplink measurement signal transmission window based on the received timing information for the uplink measurement signal reception windows; and
transmitting the uplink measurement signal during the uplink measurement signal transmission window at the calculated timing.

Item 26. The method (300) of item 17 wherein
each candidate node (18, 20) has an independent uplink measurement signal reception window, a timing of the window based on a total timing misalignment between the UE (22) and the candidate node (18, 20), and a duration of the window based on an uncertainty in the estimated total timing misalignment; and
the uplink measurement signal transmission window comprises an integral number of contiguous symbol periods sufficient to encompass the uplink measurement signal reception windows defined for all candidate nodes (18, 20).

Item 27. The method (300) of any of items 17-26 wherein the uplink measurement signal is an Uplink Synchronization Signal, USS, comprising repetition of a predetermined sequence in at least a predetermined minimum number of contiguous symbols.

Item 28. A candidate node (18, 20) comprising access node (16, 18, 20) in a wireless communication network (10) that is a candidate target for handing over a first User Equipment, UE (22), from a serving node (16) comprising a different access node (16, 18, 20) in the network (10) providing service to the first UE (22), comprising:
one or more antennas;
a transceiver operatively connected to the antennas; and
processing circuits operatively connected to the transceiver and operative to
ascertain an uplink measurement signal reception window comprising an integral number of symbol periods, not confined to predefined frame boundaries, comprising at least a predetermined minimum number of symbol periods and based on an estimated total timing misalignment between the first UE (22) and the candidate node (18, 20); and
receive an uplink measurement signal during the uplink measurement signal reception window.

Item 29. The candidate node (18, 20) of item 28 wherein the processing circuits are operative to ascertain the uplink measurement signal reception window by receiving information from the serving node (16) regarding the timing of the uplink measurement signal reception window.

Item 30. The candidate node (18, 20) of item 28 wherein the processing circuits are operative to ascertain the uplink measurement signal reception window by:
estimating a total timing misalignment between the first UE (22) and the candidate node (18, 20); and
defining the uplink measurement signal reception window based on the estimated timing misalignment.

Item 31. The candidate node (18, 20) of item 30 wherein the processing circuits are operative to estimate a total timing misalignment between the first UE (22) and the candidate node (18, 20) by:
estimating a timing misalignment between the serving node (16) and the candidate node (18, 20);
estimating a difference in a propagation delay between the UE (22) and the candidate node (18, 20), and between the UE (22) and the serving node (16); and
summing the node-to-node timing misalignment and the propagation delay difference to yield a total timing misalignment between the UE (22) and the candidate node (18, 20).

Item 32. The candidate node (18, 20) of any of items 28-31 wherein the uplink measurement signal reception window is further based on an uncertainty in the estimated total timing misalignment between the first UE (22) and the candidate node (18, 20).

Item 33. The candidate node (18, 20) of item 32 wherein the processing circuits are operative to ascertain the uplink measurement signal reception window by receiving information from the serving node (16) regarding both a timing and duration of the uplink measurement signal reception window.

Item 34. The candidate node (18, 20) of item 32 the processing circuits are further operative to:
ascertain an uncertainty in the estimated total timing misalignment; and
wherein the processing circuits are operative to define the uplink measurement signal reception window based on the estimated timing misalignment and the uncertainty by:
defining a timing of the uplink measurement signal reception window based on the estimated total timing misalignment; and
defining a number of symbol periods for the uplink measurement signal reception window in excess of the predetermined minimum number of symbol periods based on the uncertainty in the estimated total timing misalignment.

Item 35. The candidate node (18, 20) of item 34 wherein the processing circuits are operative to ascertain an uncertainty in the estimated total timing misalignment by:
ascertaining an uncertainty in the node-to-node timing misalignment based on an uncertainty in the delay of singling between the serving node (16) and the candidate node (18, 20); and
ascertaining an uncertainty in the propagation delay difference based on an uncertainty in the location of the UE (22); and
summing the uncertainty in the node-to-node timing misalignment and the uncertainty in the propagation delay difference to yield an overall uncertainty in the estimated total timing misalignment between the UE (22) and the candidate node (18, 20);
wherein the processing circuits are operative to define a number of symbol periods for the uplink measurement signal reception window based on the uncertainty by defining a number of symbol periods for the uplink measurement signal reception window based on the overall uncertainty.

Item 36. The candidate node (18, 20) of any of items 28-35 wherein the processing circuits are operative to:
ascertain the uncertainty in the estimated total timing misalignment by ascertaining a worst-case uncertainty; and
define a number of symbol periods for the uplink measurement signal reception window based on the uncertainty by defining a number of symbol periods for the uplink measurement signal reception window based on the worst-case uncertainty.

Item 37. The candidate node (18, 20) of item 36 wherein the processing circuits are further operative to:
ascertain a subband of an uplink carrier on which the uplink measurement signal will be transmitted; and
wherein the processing circuits are operative to receive an uplink measurement signal by receiving the uplink measurement signal during the uplink measurement signal reception window on the subband.

Item 38. The candidate node (18, 20) of item 37 wherein the processing circuits are operative to ascertain a subband of an uplink carrier on which the uplink measurement signal will be transmitted by receiving from the serving node (16) information identifying the subband.

Item 39. The candidate node (18, 20) of any of items 37-38 wherein the processing circuits are further operative to:
not schedule reception of user data in the subband used by the uplink measurement signal in any symbol period included in the uplink measurement signal reception window definition.

Item 40. The candidate node (18, 20) of any of items 37-39 wherein the processing circuits are further operative to schedule reception of user data in one or both of:
any symbol period not included in the uplink measurement signal reception window definition; and one or more symbol periods included in the uplink measurement signal reception but not in the subband used by the uplink measurement signal.

Item 41. The candidate node (18, 20) of item 28 wherein the processing circuits are further operative to:
coherently combine at least the predetermined number of received uplink measurement signal symbols; and
calculate at least one of a precise timing estimate and signal quality estimate for the first UE (22) based on the received uplink measurement signal.

Item 42. The candidate node (18, 20) of item 41 wherein the processing circuits are operative to coherently combine at least the predetermined number of received uplink measurement signal symbols by:
independently converting each received uplink measurement signal symbol to the frequency domain;
applying a matched filter to each frequency domain symbol to detect uplink measurement signal sequences;
accumulating the matched filter outputs over the duration of the predetermined number of uplink measurement signal symbol periods;
converting the accumulated output to the time domain; and
processing the time domain data to detect a peak, the delay of which corresponds to a timing error.

Item 43. The candidate node (18, 20) of any of items 28-42 wherein the uplink measurement signal is an Uplink Synchronization Signal, USS, comprising repetition of a predetermined sequence in at least a predetermined minimum number of contiguous symbols.

Item 44. A User Equipment, UE (22), operative in a wireless communication network (10) and being served by a serving node (16) comprising an access node (16, 18, 20) in the network (10) providing service to the UE (22), wherein the network (10) further includes a plurality of candidate nodes (18, 20), each comprising a different access node (16, 18, 20) in the network (10) that is a candidate target for handing over the UE (22) from the serving node (16), comprising:
one or more antennas;
a transceiver operatively connected to the antennas; and
processing circuits operatively connected to the transceiver and operative to transmit an uplink measurement signal comprising a plurality of repetitions of an uplink measurement symbol in an uplink measurement signal transmission window comprising an integral number of symbol periods, not confined to predefined frame boundaries, and comprising a predetermined minimum number of symbol periods.

Item 45. The UE (22) of item 44 wherein
each candidate node (18, 20) has an independent uplink measurement signal reception window, a timing of the window based on a total timing misalignment between the UE (22) and the candidate node (18, 20), and a duration of the window based on an uncertainty in the estimated total timing misalignment; and
the uplink measurement signal transmission window comprises the predetermined minimum number of symbol periods.

Item 46. The UE (22) of item 45 wherein the processing circuits are further operative to:
receive timing information for the uplink measurement signal transmission window from the serving node (16); and
transmit the uplink measurement signal during the uplink measurement signal transmission window at the calculated timing.

Item 47. The UE (22) of item 45 wherein the processing circuits are further operative to:
receive at least timing information for the uplink measurement signal reception window for each candidate node (18, 20) from the serving node (16);
calculate the timing of the uplink measurement signal transmission window based on the timing information for the uplink measurement signal reception window for each candidate node (18, 20); and
transmit the uplink measurement signal during the uplink measurement signal transmission window at the calculated timing.

Item 48. The UE (22) of item 44 wherein
each candidate node (18, 20) has an uplink measurement signal reception window of the same duration, but with possibly different timing based on a total timing misalignment between the UE (22) and the candidate node (18, 20); and
the uplink measurement signal transmission window comprises an integral number of contiguous symbol periods sufficient to encompass the uplink measurement signal reception windows defined for all candidate nodes (18, 20).

Item 49. The UE (22) of item 48 wherein the processing circuits are further operative to:
receive information defining the uplink measurement signal transmission window from the serving node (16); and
transmit the uplink measurement signal during the uplink measurement signal transmission window according to the received information.

Item 50. The UE (22) of item 48 wherein information defining the uplink measurement signal transmission window includes the duration of the uplink measurement signal transmission window.

Item 51. The UE (22) of item 48 wherein information defining the uplink measurement signal transmission window duration includes the number of symbol periods in the uplink measurement signal transmission window.

Item 52. The UE (22) of item 48 wherein the processing circuits are further operative to:
receive timing information for the uplink measurement signal reception window for each candidate node (18, 20) from the serving node (16);
calculate the timing and duration of the uplink measurement signal transmission window based on the received timing information for the uplink measurement signal reception windows; and
transmit the uplink measurement signal during the uplink measurement signal transmission window at the calculated timing.

Item 53. The UE (22) of item 44 wherein
each candidate node (18, 20) has an independent uplink measurement signal reception window, a timing of the window based on a total timing misalignment between the UE (22) and the candidate node (18, 20), and a duration of the window based on an uncertainty in the estimated total timing misalignment; and
the uplink measurement signal transmission window comprises an integral number of contiguous symbol periods sufficient to encompass the uplink measurement signal reception windows defined for all candidate nodes (18, 20).

Item 54. The UE (22) of any of items 44-53 wherein the uplink measurement signal is an Uplink Synchronization Signal, USS, comprising repetition of a predetermined sequence in at least a predetermined minimum number of contiguous symbols.

Item 55. An apparatus operative in a wireless communication network (10) as an access node (18, 20) that is a candidate handover target for a User Equipment, UE (22) served by a different access node (16), comprising:
- a first module (84) operative to ascertain an uplink measurement signal reception window comprising an integral number of symbol periods, not confined to predefined frame boundaries, comprising at least a predetermined minimum number of symbol periods and based on an estimated total timing misalignment between the first UE (22) and the candidate node (18, 20); and
- a second module (86) operative to receive an uplink measurement signal during the uplink measurement signal reception window.

Item 56. An apparatus operative in a wireless communication network (10) as a User Equipment, UE (22), comprising a module (88) operative to transmit an uplink measurement signal comprising a plurality of repetitions of an uplink measurement symbol in an uplink measurement signal transmission window comprising an integral number of symbol periods, not confined to predefined frame boundaries, and comprising a predetermined minimum number of symbol periods.

What is claimed is:

1. A method, performed by a serving node of a first User Equipment (UE) in a wireless communication network, of defining an uplink measurement signal reception window for a first candidate node comprising an access node in the network that is a candidate target for handing over the first UE, comprising:
    estimating a total timing misalignment between the first UE and the first candidate node;
    defining the uplink measurement signal reception window comprising an integral number of symbol periods, not confined to predefined frame boundaries, comprising at least a predetermined minimum number of symbol periods and based on the estimated timing misalignment; and
    transmitting information about the defined uplink measurement signal reception window to the first candidate node.

2. The method of claim 1 further comprising:
    ascertaining an uncertainty in the estimated total timing misalignment; and
    wherein defining the uplink measurement signal reception window based on the estimated timing misalignment comprises:
        defining a timing of the uplink measurement signal reception window based on the estimated total timing misalignment; and
        defining a number of symbol periods for the uplink measurement signal reception window, in excess of the predetermined minimum number of symbol periods, based on the uncertainty in the estimated total timing misalignment.

3. The method of claim 1 wherein estimating a total timing misalignment between the first UE and the first candidate node comprises:
    estimating a timing misalignment between a serving node and the first candidate node;
    estimating a difference in a propagation delay between the UE and the first candidate node, and between the UE and the serving node; and
    summing the node-to-node timing misalignment and the propagation delay difference to yield a total timing misalignment between the UE and the first candidate node.

4. The method of claim 2 wherein ascertaining an uncertainty in the estimated total timing misalignment comprises:
    ascertaining an uncertainty in the node-to-node timing misalignment based on an uncertainty in the delay of signaling between the serving node and the first candidate node; and
    ascertaining an uncertainty in the propagation delay difference based on an uncertainty in the location of the UE; and
    summing the uncertainty in the node-to-node timing misalignment and the uncertainty in the propagation delay difference to yield an overall uncertainty in the estimated total timing misalignment between the UE and the first candidate node;
    wherein defining the uplink measurement signal reception window based on the uncertainty comprises defining the uplink measurement signal reception window based on the overall uncertainty.

5. The method of claim 2 wherein:
    ascertaining an uncertainty in the estimated total timing misalignment comprises ascertaining a worst-case uncertainty; and
    defining an uplink measurement signal reception window based on the uncertainty comprises defining the uplink measurement signal reception window based on the worst-case uncertainty.

6. The method of claim 1 further comprising:
    determining a subband of an uplink carrier on which the uplink measurement signal will be transmitted; and
    transmitting information about the subband to the first candidate node.

7. The method of claim 6 wherein the first candidate node does not schedule reception of user data in the subband used by the uplink measurement signal in any symbol period included in the uplink measurement signal reception window definition.

8. The method of claim 7 wherein the first candidate node schedules reception of user data in one or both of:
    any symbol period not included in the uplink measurement signal reception window definition; and
    one or more symbol periods included in the uplink measurement signal reception but not in the subband used by the uplink measurement signal.

9. The method of claim 1 wherein the first candidate node coherently combines at least the predetermined number of received uplink measurement signal symbols and calculates at least one of a precise timing estimate and signal quality estimate for the first UE based on the received uplink measurement signal.

10. The method of claim 1 further comprising repeating the method steps for a second candidate node comprising an access node in the network, different than the first candidate node, that is also a candidate target for handing over the first UE.

11. The method of claim 10 wherein the number of symbol periods for each uplink measurement signal reception window is the predetermined minimum number of symbol periods, and further comprising:
    determining an uplink measurement signal transmission window comprising an integral number of contiguous symbol periods sufficient to encompass both the uplink measurement signal reception window defined for the first candidate node and the uplink measurement signal reception window defined for the second candidate node; and transmitting information about the uplink measurement signal transmission window to the first UE.

12. The method of claim 10 wherein the number of symbol periods for each uplink measurement signal reception window is the predetermined minimum number of symbol periods, and further comprising:

transmitting information about timing of the uplink measurement signal reception windows for the first and second candidate nodes to the first UE;

whereby the first UE determines, from the reception window timing information, an uplink measurement signal transmission window comprising an integral number of contiguous symbol periods sufficient to encompass both the uplink measurement signal reception window defined for the first candidate node and the uplink measurement signal reception window defined for the second candidate node.

13. The method of claim 2 further comprising repeating the method steps for a second candidate node comprising an access node in the network, different than the first candidate node, that is also a candidate target for handing over the first UE.

14. The method of claim 13 wherein the number of symbol periods for the uplink measurement signal reception window in excess of the predetermined minimum number of symbol periods is greater than zero for at least one of the first and second candidate nodes, and further comprising:

transmitting information about timing of an uplink measurement signal transmission window to the first UE, wherein the uplink measurement signal transmission window comprises the same predetermined minimum number of symbol periods as the uplink measurement signal reception windows.

15. The method of claim 13 wherein the number of symbol periods for the uplink measurement signal reception window in excess of the predetermined minimum number of symbol periods is greater than zero for at least one of the first and second candidate nodes, and further comprising:

determining an uplink measurement signal transmission window comprising an integral number of contiguous symbol periods sufficient to encompass both the uplink measurement signal reception window defined for the first candidate node and the uplink measurement signal reception window defined for the second candidate node; and transmitting information about the uplink measurement signal transmission window to the first UE.

16. The method of claim 13 wherein the number of symbol periods for each uplink measurement signal reception window is the predetermined minimum number of symbol periods, and further comprising:

transmitting information about timing of the uplink measurement signal reception windows for the first and second candidate nodes to the first UE;

whereby the first UE determines, from the reception window timing information, an uplink measurement signal transmission window comprising an integral number of contiguous symbol periods sufficient to encompass both the uplink measurement signal reception window defined for the first candidate node and the uplink measurement signal reception window defined for the second candidate node.

17. The method of claim 1 wherein the uplink measurement signal is an Uplink Synchronization Signal, USS, comprising repetition of a predetermined sequence in at least a predetermined minimum number of contiguous symbols.

18. A serving node comprising an access node in a wireless communication network providing service to a first User Equipment (UE) in the network, the network also including a plurality of candidate nodes comprising access node s in the network, other than the serving node, that are candidate targets for handing over the first UE, comprising:

one or more antennas;
a transceiver operatively connected to the antennas; and
processing circuits operatively connected to the transceiver and operative to
estimate a total timing misalignment between the first UE and a first candidate node;
define an uplink measurement signal reception window comprising an integral number of symbol periods, not confined to predefined frame boundaries, comprising at least a predetermined minimum number of symbol periods and based on the estimated timing misalignment; and
transmit information about the defined uplink measurement signal reception window to the first candidate node.

19. The serving node of claim 18 wherein the processing circuits are further operative to:

ascertain an uncertainty in the estimated total timing misalignment; and
wherein the processing circuits are operative to define the uplink measurement signal reception window based on the estimated timing misalignment by:
defining a timing of the uplink measurement signal reception window based on the estimated total timing misalignment; and
defining a number of symbol periods for the uplink measurement signal reception window, in excess of the predetermined minimum number of symbol periods, based on the uncertainty in the estimated total timing misalignment.

20. The serving node of claim 18 wherein the processing circuits are operative to estimate a total timing misalignment between the first UE and the first candidate node by:

estimating a timing misalignment between a serving node and the first candidate node;
estimating a difference in a propagation delay between the UE and the first candidate node, and between the UE and the serving node; and
summing the node-to-node timing misalignment and the propagation delay difference to yield a total timing misalignment between the UE and the first candidate node.

21. The serving node of claim 19 wherein the processing circuits are operative to ascertain an uncertainty in the estimated total timing misalignment by:

ascertaining an uncertainty in the node-to-node timing misalignment based on an uncertainty in the delay of singling between the serving node and the first candidate node;
ascertaining an uncertainty in the propagation delay difference based on an uncertainty in the location of the UE; and
summing the uncertainty in the node-to-node timing misalignment and the uncertainty in the propagation delay difference to yield an overall uncertainty in the estimated total timing misalignment between the UE and the first candidate node;
wherein the processing circuits are operative to define the uplink measurement signal reception window based on the uncertainty by defining the uplink measurement signal reception window based on the overall uncertainty.

22. The serving node of claim 18 wherein the processing circuits are operative to:
ascertain an uncertainty in the estimated total timing misalignment by ascertaining a worst-case uncertainty; and
define an uplink measurement signal reception window based on the uncertainty by defining the uplink measurement signal reception window based on the worst-case uncertainty.

23. The serving node of claim 18 wherein the processing circuits are further operative to:
determine a subband of an uplink carrier on which the uplink measurement signal will be transmitted; and
transmit information about the subband to the first candidate node.

24. The serving node of claim 23 wherein the first candidate node does not schedule reception of user data in the subband used by the uplink measurement signal in any symbol period included in the uplink measurement signal reception window definition.

25. The serving node of claim 23 wherein the first candidate node schedules reception of user data in one or both of:
any symbol period not included in the uplink measurement signal reception window definition; and
one or more symbol periods included in the uplink measurement signal reception but not in the subband used by the uplink measurement signal.

26. The serving node of claim 18 wherein the first candidate node coherently combines at least the predetermined number of received uplink measurement signal symbols and calculates at least one of a precise timing estimate and signal quality estimate for the first UE based on the received uplink measurement signal.

27. The serving node of claim 18 wherein the processing circuits are further operative to repeat the serving node steps for a second candidate node.

28. The serving node of claim 27 wherein the number of symbol periods for each uplink measurement signal reception window is the predetermined minimum number of symbol periods, and wherein the processing circuits are further operative to:
determine an uplink measurement signal transmission window comprising an integral number of contiguous symbol periods sufficient to encompass both the uplink measurement signal reception window defined for the first candidate node and the uplink measurement signal reception window defined for the second candidate node; and
transmit information about the uplink measurement signal transmission window to the first UE.

29. The serving node of claim 27 wherein the number of symbol periods for each uplink measurement signal reception window is the predetermined minimum number of symbol periods, and wherein the processing circuits are further operative to:
transmit information about timing of the uplink measurement signal reception windows for the first and second candidate nodes to the first UE;
whereby the first UE determines, from the reception window timing information, an uplink measurement signal transmission window comprising an integral number of contiguous symbol periods sufficient to encompass both the uplink measurement signal reception window defined for the first candidate node and the uplink measurement signal reception window defined for the second candidate node.

30. The serving node of claim 19 wherein the processing circuits are further operative to repeat the serving node steps for a second candidate node.

31. The serving node of claim 30 wherein the number of symbol periods for the uplink measurement signal reception window in excess of the predetermined minimum number of symbol periods is greater than zero for at least one of the first and second candidate nodes, and wherein the processing circuits are further operative to:
transmit information about timing of an uplink measurement signal transmission window to the first UE, wherein the uplink measurement signal transmission window comprises the same predetermined minimum number of symbol periods as the uplink measurement signal reception windows.

32. The serving node of claim 30 wherein the number of symbol periods for the uplink measurement signal reception window in excess of the predetermined minimum number of symbol periods is greater than zero for at least one of the first and second candidate node, and wherein the processing circuits are further operative to:
determine an uplink measurement signal transmission window comprising an integral number of contiguous symbol periods sufficient to encompass both the uplink measurement signal reception window defined for the first candidate nodes and the uplink measurement signal reception window defined for the second candidate node; and
transmit information about the uplink measurement signal transmission window to the first UE.

33. The serving node of claim 30 wherein the number of symbol periods for each uplink measurement signal reception window is the predetermined minimum number of symbol periods, and wherein the processing circuits are further operative to:
transmit information about timing of the uplink measurement signal reception windows for the first and second candidate nodes to the first UE;
whereby the first UE determines, from the reception window timing information, an uplink measurement signal transmission window comprising an integral number of contiguous symbol periods sufficient to encompass both the uplink measurement signal reception window defined for the first candidate node and the uplink measurement signal reception window defined for the second candidate node.

34. The serving node of claim 18 wherein the uplink measurement signal is an Uplink Synchronization Signal, USS, comprising repetition of a predetermined sequence in at least a predetermined minimum number of contiguous symbols.

* * * * *